US010892866B2

(12) United States Patent
Kumar et al.

(10) Patent No.: US 10,892,866 B2
(45) Date of Patent: Jan. 12, 2021

(54) ALMOST-BLANK SUBFRAME-BASED GAPLESS INTER-FREQUENCY POSITIONING REFERENCE SIGNAL MEASUREMENT IN CARRIER AGGREGATION MODE

(71) Applicant: QUALCOMM Incorporated, San Diego, CA (US)

(72) Inventors: Akash Kumar, Hyderabad (IN); Amit Jain, San Diego, CA (US); Stephen William Edge, Escondido, CA (US)

(73) Assignee: QUALCOMM Incorporated, San Diego, CA (US)

( * ) Notice: Subject to any disclaimer, the term of this patent is extended or adjusted under 35 U.S.C. 154(b) by 168 days.

(21) Appl. No.: 16/035,570

(22) Filed: Jul. 13, 2018

(65) Prior Publication Data

US 2020/0021409 A1 Jan. 16, 2020

(51) Int. Cl.
*H04L 5/00* (2006.01)
*H04W 72/04* (2009.01)

(52) U.S. Cl.
CPC ......... *H04L 5/0048* (2013.01); *H04W 72/042* (2013.01); *H04W 72/0446* (2013.01); *H04W 72/0453* (2013.01); *H04L 5/001* (2013.01)

(58) Field of Classification Search
None
See application file for complete search history.

(56) References Cited

U.S. PATENT DOCUMENTS

| 8,738,041 | B2 | 5/2014 | Siomina et al. | |
|---|---|---|---|---|
| 9,226,173 | B2* | 12/2015 | Sadek | H04W 72/082 |
| 9,332,505 | B2* | 5/2016 | Siomina | H04J 11/0023 |
| 9,467,885 | B2 | 10/2016 | Tenny et al. | |
| 9,596,042 | B2 | 3/2017 | Siomina et al. | |
| 10,193,669 | B2* | 1/2019 | Park | H04W 72/0406 |
| 2011/0039577 | A1* | 2/2011 | Stern-Berkowitz | H04W 64/00 455/456.1 |
| 2012/0083278 | A1 | 4/2012 | Kazmi et al. | |
| 2012/0231790 | A1* | 9/2012 | Lindoff | H04W 48/16 455/434 |
| 2013/0040673 | A1* | 2/2013 | Siomina | H04W 64/00 455/501 |

(Continued)

*Primary Examiner* — Ayaz R Sheikh
*Assistant Examiner* — Faiyazkhan Ghafoerkhan
(74) *Attorney, Agent, or Firm* — MG-IP Law, P.C.

(57) ABSTRACT

In an aspect, to perform inter-frequency measurements by a user equipment (UE) in a carrier aggregation mode, the UE receives assistance data identifying one or more reference signal occasions for one or more neighbor cells, receives information identifying one or more subframes during which the one or more neighbor cells do not carry data transmissions, identifies, for a first reference signal occasion of the one or more reference signal occasions, a first subframe of the one or more subframes that overlaps the first reference signal occasion, tunes, during the first subframe, a first active carrier receiver of a plurality of active carrier receivers away from a first frequency on which the first subframe is transmitted to a second frequency on which the first reference signal occasion is transmitted, and measures, by the first active carrier receiver, the first reference signal occasion on the second frequency during the first subframe.

21 Claims, 11 Drawing Sheets

(56) References Cited

U.S. PATENT DOCUMENTS

| | | | |
|---|---|---|---|
| 2013/0229971 A1* | 9/2013 | Siomina | H04W 24/10 370/312 |
| 2014/0064133 A1* | 3/2014 | Kazmi | H04W 24/10 370/252 |
| 2014/0094181 A1* | 4/2014 | Kakinada | H04W 16/08 455/446 |
| 2014/0112254 A1* | 4/2014 | Lindoff | H04W 74/002 370/328 |
| 2014/0119334 A1* | 5/2014 | Kazmi | H04W 24/10 370/330 |
| 2014/0233457 A1* | 8/2014 | Koutsimanis | H04L 5/0073 370/328 |
| 2015/0094091 A1* | 4/2015 | Stern-Berkowitz | H04W 64/003 455/456.1 |
| 2015/0172003 A1* | 6/2015 | Kim | H04L 5/0055 370/281 |
| 2015/0181481 A1* | 6/2015 | Masini | H04W 36/0083 455/436 |
| 2015/0208410 A1* | 7/2015 | Koutsimanis | H04W 72/0426 370/252 |
| 2016/0066293 A1* | 3/2016 | Siomina | H04W 64/00 370/328 |
| 2016/0119907 A1* | 4/2016 | Seo | H04J 11/0056 375/260 |
| 2016/0164660 A1* | 6/2016 | Kim | H04J 1/10 370/279 |
| 2016/0173148 A1* | 6/2016 | Kazmi | H04B 1/10 455/296 |
| 2017/0127309 A1* | 5/2017 | Siomina | H04W 72/082 |
| 2017/0135062 A1* | 5/2017 | Stern-Berkowitz | H04W 24/10 |
| 2018/0110017 A1* | 4/2018 | Jha | H04L 1/0005 |
| 2019/0320401 A1* | 10/2019 | Siomina | H04W 56/0015 |

* cited by examiner

ALMOST-BLANK SUBFRAME-BASED GAPLESS INTER-FREQUENCY POSITIONING REFERENCE SIGNAL MEASUREMENT IN CARRIER AGGREGATION MODE

INTRODUCTION

Aspects of this disclosure relate generally to telecommunications, and more particularly to a user equipment (UE) performing inter-frequency measurements in a carrier aggregation (CA) mode and the like.

Wireless communication systems are widely deployed to provide various types of communication content, such as voice, data, multimedia, and so on. Typical wireless communication systems are multiple-access systems capable of supporting communication with multiple users by sharing available system resources (e.g., bandwidth, transmit power, etc.). Examples of such multiple-access systems include Code Division Multiple Access (CDMA) systems, Time Division Multiple Access (TDMA) systems, Frequency Division Multiple Access (FDMA) systems, Orthogonal Frequency Division Multiple Access (OFDMA) systems, and others. These systems are often deployed in conformity with specifications such as Long Term Evolution (LTE) provided by the Third Generation Partnership Project (3GPP), Ultra Mobile Broadband (UMB) and Evolution Data Optimized (EV-DO) provided by the Third Generation Partnership Project 2 (3GPP2), 802.11 provided the Institute of Electrical and Electronics Engineers (IEEE), etc.

A fifth generation mobile standard, referred to herein as "5G," "5G New Radio," or "5G NR," calls for higher data transfer speeds, greater numbers of connections, and better coverage, among other improvements. The 5G standard, according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments. Consequently, the spectral efficiency of 5G mobile communications should be significantly enhanced compared to the current LTE standard. Furthermore, signaling efficiencies should be enhanced and latency should be substantially reduced compared to current standards.

In cellular networks, "macro cell" access points provide connectivity and coverage to a large number of users over a certain geographical area. A macro network deployment is carefully planned, designed, and implemented to offer good coverage over the geographical region. To provide higher data transfer speeds, greater numbers of connections, and better coverage, for example, additional "small cell," typically low-power, access points have recently begun to be deployed to supplement conventional macro networks. Small cell access points may also provide incremental capacity growth, richer user experience, and so on. Small cell operations for LTE and 5G networks, for example, have been extended into the unlicensed frequency spectrum, such as the Unlicensed National Information Infrastructure (U-NII) band used by Wireless Local Area Network (WLAN) technologies. This extension of small cell LTE and 5G operations is designed to increase spectral efficiency and hence capacity of LTE/5G systems.

With the dense deployment of macro cell base stations and small cell base stations, especially where such base stations operate on the same or similar frequencies, interference, especially at UEs within the cell range extension (CRE) area at the outer limits of a base station's coverage area, has become a significant problem.

SUMMARY

The following presents a simplified summary relating to one or more aspects disclosed herein. As such, the following summary should not be considered an extensive overview relating to all contemplated aspects, nor should the following summary be regarded to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

In an aspect, a method for performing inter-frequency reference signal measurements by a UE in a CA mode includes tuning, by the UE, a receiver of a plurality of receivers of the UE away from a low overlap carrier frequency to a first reference signal carrier frequency on which a first reference signal is transmitted, wherein the low overlap carrier frequency has a pattern of one or more subframes during which the low overlap carrier frequency does not carry data transmissions, and wherein the pattern overlaps with a first reference signal measurement occasion of the first reference signal transmitted on the first reference signal carrier frequency more than other patterns of subframes that do not carry data transmissions of other carrier frequencies to which the plurality of receivers of the UE are tuned overlap with the first reference signal measurement occasion; measuring, by the receiver of the UE, the first reference signal during the first reference signal measurement occasion on the first reference signal carrier frequency during the pattern of one or more subframes during which the low overlap carrier frequency does not carry data transmissions; and tuning, by the UE, the receiver from the first reference signal carrier frequency back to the low overlap carrier frequency at an end of the first reference signal measurement occasion.

In an aspect, a method for assisting performance of inter-frequency measurements by a UE in a CA mode includes identifying, by the location server, a first receiver of a plurality of receivers of the UE that supports a first reference signal carrier frequency of a first inter-frequency neighbor cell, the plurality of receivers tuned to a corresponding plurality of active carrier frequencies; determining, by the location server, a first pattern of one or more subframes during which a first active carrier frequency of the plurality of active carrier frequencies of the UE does not carry data transmissions; including, by the location server, information about the first inter-frequency neighbor cell in assistance data for the UE based on a reference signal measurement occasion of the first reference signal carrier frequency overlapping a subframe of the first pattern of one or more subframes by more than a threshold.

In an aspect, an apparatus for performing inter-frequency reference signal measurements by a UE in a CA mode includes a transceiver of the UE configured to: tune a receiver of a plurality of receivers of the UE away from a low overlap carrier frequency to a first reference signal carrier frequency on which a first reference signal is transmitted, wherein the low overlap carrier frequency has a pattern of one or more subframes during which the low overlap carrier frequency does not carry data transmissions, and wherein the pattern overlaps with a first reference signal measurement occasion of the first reference signal transmitted on the first reference signal carrier frequency more than other patterns of subframes that do not carry data transmissions of other carrier frequencies to which the plurality of receivers of the UE are tuned overlap with the first reference signal measurement occasion; cause the receiver to measure the first reference signal during the first reference signal measurement occasion on the first reference signal carrier frequency during the pattern of one or more subframes during which the low overlap carrier frequency does not carry data transmissions; and tune the receiver from the first reference signal carrier frequency back to the low overlap carrier frequency at an end of the first reference signal measurement occasion.

In an aspect, an apparatus for assisting performance of inter-frequency measurements by a UE in a CA mode includes at least one processor of the location server configured to: identify a first receiver of a plurality of receivers of the UE that supports a first reference signal carrier frequency of a first inter-frequency neighbor cell, the plurality of receivers tuned to a corresponding plurality of active carrier frequencies; determine a first pattern of one or more subframes during which a first active carrier frequency of the plurality of active carrier frequencies of the UE does not carry data transmissions; include information about the first inter-frequency neighbor cell in assistance data for the UE based on a reference signal measurement occasion of the first reference signal carrier frequency overlapping a subframe of the first pattern of one or more subframes by more than a threshold.

In an aspect, a non-transitory computer-readable medium storing computer-executable instructions for performing inter-frequency reference signal measurements by a UE in a CA mode includes computer-executable instructions comprising at least one instruction instructing the UE to tune a receiver of a plurality of receivers of the UE away from a low overlap carrier frequency to a first reference signal carrier frequency on which a first reference signal is transmitted, wherein the low overlap carrier frequency has a pattern of one or more subframes during which the low overlap carrier frequency does not carry data transmissions, and wherein the pattern overlaps with a first reference signal measurement occasion of the first reference signal transmitted on the first reference signal carrier frequency more than other patterns of subframes that do not carry data transmissions of other carrier frequencies to which the plurality of receivers of the UE are tuned overlap with the first reference signal measurement occasion; at least one instruction instructing the receiver of the UE to measure the first reference signal during the first reference signal measurement occasion on the first reference signal carrier frequency during the pattern of one or more subframes during which the low overlap carrier frequency does not carry data transmissions; and at least one instruction instructing the UE to tune the receiver from the first reference signal carrier frequency back to the low overlap carrier frequency at an end of the first reference signal measurement occasion.

In an aspect, a non-transitory computer-readable medium storing computer-executable instructions for assisting performance of inter-frequency measurements by a UE in a CA mode includes computer-executable instructions comprising at least one instruction instructing the location server to identify a first receiver of a plurality of receivers of the UE that supports a first reference signal carrier frequency of a first inter-frequency neighbor cell, the plurality of receivers tuned to a corresponding plurality of active carrier frequencies; at least one instruction instructing the location server to determine a first pattern of one or more subframes during which a first active carrier frequency of the plurality of active carrier frequencies of the UE does not carry data transmissions; and at least one instruction instructing the location server to include information about the first inter-frequency neighbor cell in assistance data for the UE based on a reference signal measurement occasion of the first reference signal carrier frequency overlapping a subframe of the first pattern of one or more subframes by more than a threshold.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

Disclosed are techniques for performing inter-frequency measurements by a UE in a CA mode. Also disclosed are techniques for assisting performance of inter-frequency measurements by a UE in a CA mode.

These and other aspects of the disclosure are provided in the following description and related drawings directed to various examples provided for illustration purposes. Alternate aspects may be devised without departing from the scope of the disclosure. Additionally, well-known aspects of the disclosure may not be described in detail or may be omitted so as not to obscure more relevant details.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., Application Specific Integrated Circuits (ASICs)), by program instructions being executed by one or more processors, or by a combination of both. In addition, for each of the aspects described herein, the corresponding form of any such aspect may be implemented as, for example, "logic configured to" perform the described action.

Figure 1:
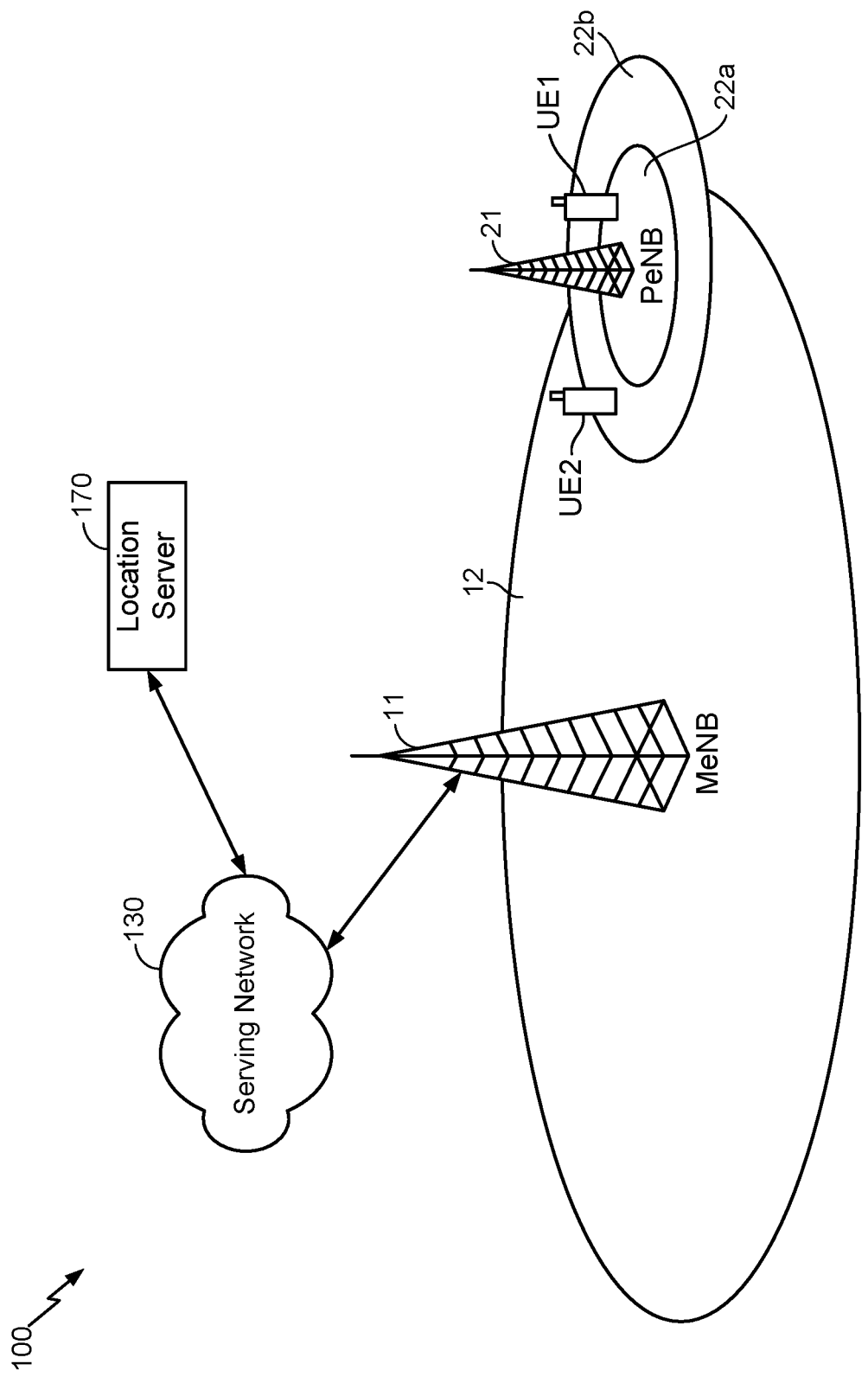
FIG. 1 illustrates an exemplary heterogeneous network according to at least one aspect of the disclosure.

FIG. 1 illustrates an exemplary heterogeneous network 100 comprising a macro cell base station 11 (e.g., a macro eNodeB, or "MeNB"), a macro cell coverage area 12 served by the macro cell base station 11, a small cell base station 21 (e.g., a pico eNodeB, or "PeNB"), and a small cell coverage area served by the small cell base station 21. In an aspect, the small cell cell area is divided into a kernel cell coverage area 22a and an extended cell coverage area 22b, also referred to as a cell range extension (CRE) area. FIG. 1 further illustrates a first exemplary user equipment (UE1) located in the kernel cell coverage area 22a and a second user equipment (UE2) located in the extended cell coverage area 22b.

In the example of FIG. 1, the small cell base station 21 is deployed in conjunction with and to supplement the coverage of the macro cell base station 11. As used herein, small cells generally refer to a class of low-powered base stations that may include or be otherwise referred to as femto cells, pico cells, micro cells, etc. They may be deployed to provide improved signaling, incremental capacity growth, richer user experience, and so on.

A base station (e.g., macro cell base station 11, small cell base station 21) interacts with one or more UEs (e.g., UE1, UE2) via DownLink (DL) (e.g., a paging channel, a control channel, a broadcast channel, a forward traffic channel, etc.) and/or UpLink (UL) (e.g., a reverse traffic channel, a reverse control channel, an access channel, etc.) connections. In general, the DL corresponds to communication from a base station to a UE, while the UL corresponds to communication from a UE to a base station.

The macro cell base station 11 is configured to provide communication coverage within the macro cell coverage area 12, which may cover a few blocks within a neighborhood or several square miles in a rural environment. Meanwhile, the small cell base station 21 is configured to provide communication coverage within respective small cell coverage areas 22a and 22b. Note that although the base stations illustrated in FIG. 1 are referred to as eNodeBs, the disclosure is not so limited and they may be any type of access point. For example, they may instead be gNodeBs (5G NR access points).

For their wireless air interfaces, each base station (e.g., macro cell base station 11, small cell base station 21) may operate according to one of several radio access technologies (RATs) depending on the network in which it is deployed. These networks may include, for example, 5G millimeter wave (mmWave), Multiple Input, Multiple Output (MIMO), CDMA networks, TDMA networks, FDMA networks, OFDMA networks, Single-Carrier FDMA (SC-FDMA) networks, and so on. The terms "network" and "system" are often used interchangeably. A CDMA network may implement an RAT such as Universal Terrestrial Radio Access (UTRA), cdma2000, etc. UTRA includes Wideband-CDMA (W-CDMA) and Low Chip Rate (LCR). cdma2000 covers IS-2000, IS-95 and IS-856 standards. A TDMA network may implement a RAT such as Global System for Mobile Communications (GSM). An OFDMA network may implement an RAT, such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). LTE is a release of UMTS that uses E-UTRA. UTRA, E-UTRA, GSM, UMTS, and LTE are described in documents from 3GPP. cdma2000 is described in documents from 3GPP2. These documents are publicly available.

The 5G NR mobile standard calls for higher data transfer speeds, greater numbers of connections, and better coverage, among other improvements. 5G NR radio access can be configured to utilize existing LTE infrastructure for mobility management (referred to as a non-standalone mode) or to operate stand-alone with a new multi-access 5G NextGen Core Network (NGCN). 5G is a unifying network concept that provides connectivity across diverse spectrum bands and radio access types. 5G expands spectrum usage to low-bands below 1 GHz, mid-bands between 1 GHz and 6 GHz, and high-bands generally above 24 GHz, (e.g., 5G mmWave). 5G also allows for access to licensed spectrum, shared spectrum, and unlicensed spectrum. As such, the discussion above with reference to FIG. 1, including systems using licensed spectrum, shared spectrum, and unlicensed spectrum is equally applicable to both 4G LTE and 5G NR.

As is further illustrated in FIG. 1, the macro cell base station 11 may communicate with a serving network 130, such as a Home Public Land Mobile Network (HPLMN) or a Visited Public Land Mobile Network (VPLMN), via a wired link or via a wireless link, while the small cell base station 21 may also similarly communicate with the serving network 130 via its own wired or wireless link (not shown). For example, the small cell base station 21 may communicate with the serving network 130 by way of an Internet Protocol (IP) connection, such as via a Digital Subscriber Line (DSL, e.g., including Asymmetric DSL (ADSL), High Data Rate DSL (HDSL), Very High Speed DSL (VDSL), etc.), a television cable carrying IP traffic, a Broadband over Power Line (BPL) connection, an Optical Fiber (OF) cable, a satellite link, or some other link.

It will be appreciated that the macro cell base station 11 and/or the small cell base station 21 may be connected to the serving network 130 using any of a multitude of devices or methods. These connections may be referred to as the "backbone" or the "backhaul" of the network, and may, in some implementations, be used to manage and coordinate communications between the macro cell base station 11 and/or the small cell base station 21. In this way, as a UE (e.g., UE1, UE2) moves through such a mixed communication network environment that provides both macro cell and small cell coverage, the UE may be served in certain locations by macro cell base stations (e.g., macro cell base station 11), at other locations by small cell base stations (e.g., small cell base station 21), and, in some scenarios, by both macro cell and small cell base stations (e.g., UE2). As described with reference to FIG. 2, the various base stations may be referred to as the "RAN" (Radio Access Network) and the backhaul connections to the serving network 130 may be referred to as the "core network."

To secure reliable transmission of the control channel and efficient transmission of the Physical Downlink Shared Channel (PDSCH) of the UE2 located in the extended cell coverage area 22b, macro cell base stations (e.g., macro cell base station 11) are configured to transmit, during almost-blank subframes (ABS), only limited (or necessary) data, e.g., only signals such as Physical Broadcast Channel (PBCH) signals, Primary/Secondary Synchronization Signals (PSS/SSS), and/or cell-specific reference signals (CRS). As such, during ABS subframes, the UE2 will experience low interference from the macro cell base station 11 for the data channel, and conversely, high interference from macro cell base stations transmitting in non-ABS subframes. On the other hand, for UEs located sufficiently close to the center of the small cell coverage area (e.g., UE1), the interference from the macro cell base station 11 may be relatively small as compared with the signal from the small cell base station 21.

Figure 2:
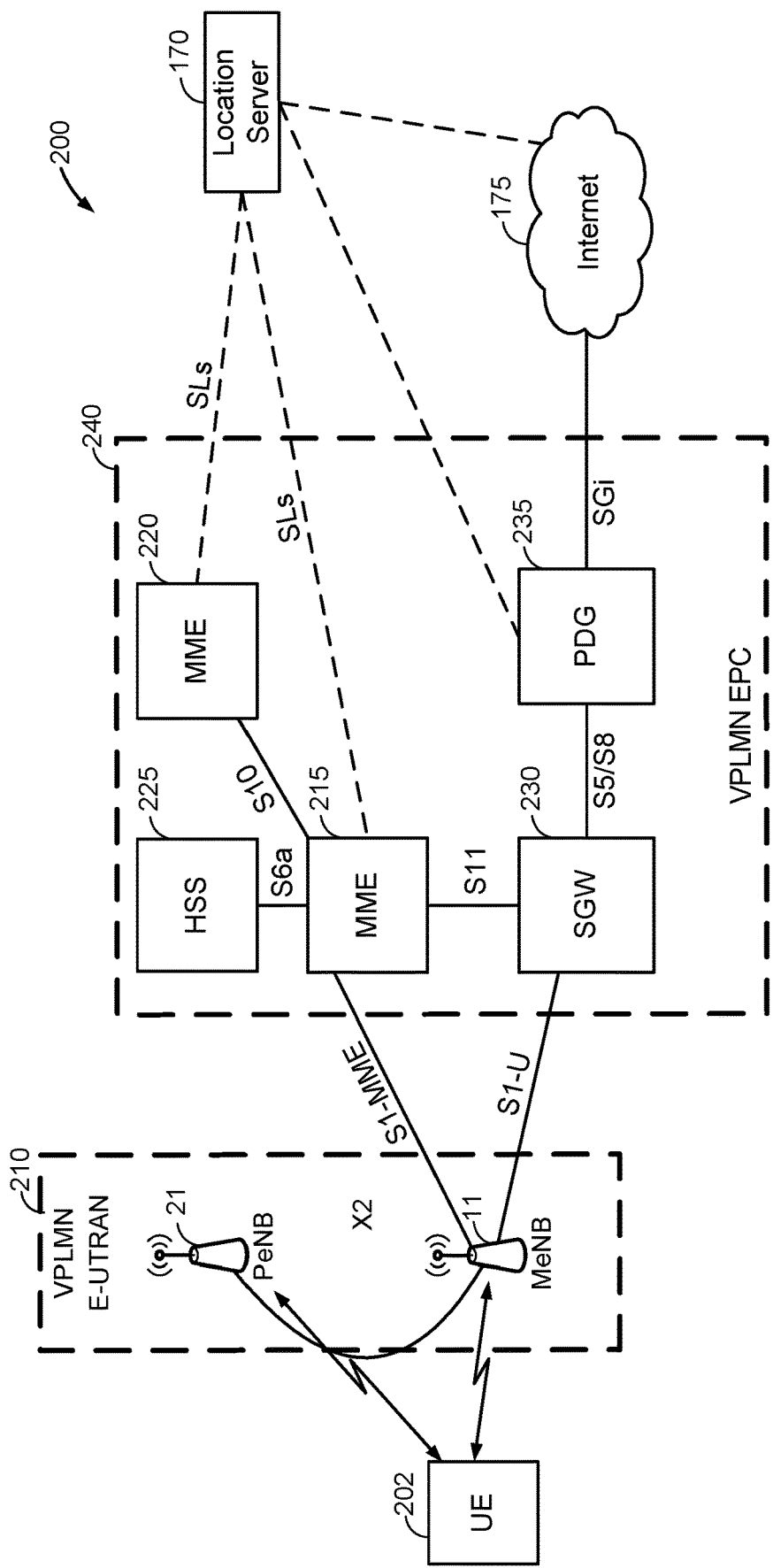
FIG. 2 illustrates an example configuration of a Radio Access Network (RAN) and a portion of a core network that is based on an Evolved Packet System (EPS), or LTE, network according to at least one aspect of the disclosure.

FIG. 2 illustrates an example configuration of a RAN 210 and a portion of a core network 240 of a communications system 200 based on an EPS or LTE network, in accordance with an aspect of the disclosure. Referring to FIG. 2, the RAN 210 in the EPS/LTE network includes base stations 11 and 21, which support LTE and/or wireless access, for example. In FIG. 2, the core network 240 includes a plurality of Mobility Management Entities (MMEs) 215 and 220, a Home Subscriber Server (HSS) 225, a Serving Gateway (SGW) 230, and a Packet Data Network Gateway (PDG) 235. Network interfaces between these components, the RAN 210, and the Internet 175 are illustrated in FIG. 2 and are defined in Table 2 (below) as follows:

A high-level description of the components shown in FIG. 2 will now be provided. However, these components are each well-known in the art from various 3GPP Technical Specifications (TSs), such as TS 23.401, and the description contained herein is not intended to be an exhaustive description of all functionalities performed by these components.

Referring to FIG. 2, the base stations 11 and 21 are configured to provide LTE and/or 5G NR radio access to one or more UEs 202 (which may correspond to, for example, UE1 and/or UE2) and to provide signaling and voice/data connectivity between any UE 202 and elements in core network 240, such as MME 215 and SGW 230. As described further herein, the base stations 11 and 21 may also be configured to broadcast positioning reference signals (PRS) to nearby UEs 202 to enable any UE 202 to make measurements of PRS timing differences between pairs of base stations and thereby enable a location estimate of the UE 202 to be obtained by the UE 202 itself or by a location server (e.g., location server 170) to which the timing difference measurements may be sent using Observed Time Difference of Arrival (OTDOA) positioning.

The term "location estimate" is used herein to refer to an estimate of a location for a UE 202, which may be geographic (e.g., may comprise a latitude, longitude, and possibly altitude) or civic (e.g., may comprise a street address, building designation, or precise point or area within or nearby to a building or street address, such as a particular entrance to a building, a particular room or suite in a building, or a landmark such as a town square). A location estimate may also be referred to as a "location," a "position," a "fix," a "position fix," a "location fix," a "position estimate," a "fix estimate," or by some other term. The means of obtaining a location estimate may be referred to generically as "positioning," "locating," or "position fixing." A particular solution for obtaining a location estimate may be referred to as a "location solution." A particular method for obtaining a location estimate as part of a location solution may be referred to as a "position method" or as a "positioning method."

TABLE 1

EPS/LTE Core Network Connection Definitions

| Network Interface | Description |
| --- | --- |
| S1-MME | Reference point for the control plane protocol between RAN 210 and MME 215. |
| S1-U | Reference point between RAN 210 and SGW 230 for the per bearer user plane tunneling and inter-eNodeB path switching during handover. |
| S5 | Provides user plane tunneling and tunnel management between SGW 230 and PDG 235. It is used for SGW relocation due to UE mobility and if the SGW 230 needs to connect to a non-collocated PDG for the required Packet Data Network (PDN) connectivity. |
| S6a | Enables transfer of subscription and authentication data for authenticating/authorizing user access to the evolved system (Authentication, Authorization, and Accounting (AAA) interface) between MME 215 and HSS 225. |
| S8 | Inter-PLMN reference point providing user and control plane between the SGW 230 in a VPLMN and the PDG 235 in a HPLMN. S8 is the inter-PLMN variant of S5. |
| S10 | Reference point between MMEs 215 and 220 for MME relocation and MME to MME information transfer. |
| S11 | Reference point between MME 215 and SGW 230. |
| SGi | Reference point between the PDG 235 and a packet data network, shown in FIG. 2 as the Internet 175. The packet data network may be an operator external public or private packet data network or an intra-operator packet data network (e.g., for provision of IP Multimedia Subsystem (IMS) services). |
| SLs | Interface between an MME and the location server 170 in the event that location server 170 is or contains an Enhanced Serving Mobile Location Center (E-SMLC) |
| X2 | Reference point between two different eNodeBs used for UE handoffs. |

Referring to FIG. 2, the MMEs 215 and 220 are configured to support network attachment of UE 202, mobility of UE 202, and bearer assignment to UE 202. MME functions include: Non-Access Stratum (NAS) signaling to UEs, NAS signaling security, mobility management for inter- and intra-technology handovers of UEs, PDG and SGW selection, and MME selection for UE handovers with MME change.

Referring to FIG. 2, the SGW 230 is the gateway that terminates the user plane interface toward the RAN 210. For each UE 202 attached to the core network 240 for an EPS-based system, at a given point of time, there may be a single SGW 230. The functions of the SGW 230 include: mobility anchor point, packet routing and forwarding, and transport level packet marking in the uplink and the downlink (e.g., setting the DiffSery Code Point (DSCP) based on a Quality of Service (QoS) Class Identifier (QCI) of an associated EPS bearer).

Referring to FIG. 2, the PDG 235 is the gateway that terminates the SGi user plane interface toward the PDN, e.g., the Internet 175. If a UE 202 is accessing multiple PDNs, there may be more than one PDG 235 for that UE 202. PDG 235 functions include: packet filtering (e.g., using deep packet inspection), UE IP address allocation, transport level packet marking in the uplink and downlink (e.g., setting the DSCP based on the QCI of an associated EPS bearer), accounting for inter operator charging, UL and DL bearer binding, UL and DL rate enforcement and service level rate enforcement, and UL bearer binding. The PDG 235 may provide PDN connectivity to both GSM/EDGE Radio Access Network (GERAN)/Universal Terrestrial Radio Access Network (UTRAN)-only UEs, and Enhanced UTRAN (E-UTRAN)-capable UEs using any of E-UTRAN, GERAN, or UTRAN. The PDG 235 may provide PDN connectivity to E-UTRAN-capable UEs using E-UTRAN only over the S5/S8 interface.

In FIG. 2, the location server 170 is shown as connected to one or more of the Internet 175, the PDG 235, MME 220, and MME 215. The connections to MME 215 and MME 220 are applicable when location server 170 is or contains an E-SMLC. The connections to the Internet 175 and/or to the PDG 235 are applicable when location server 170 is or contains a Secure User Plane Location (SUPL) Location Platform (SLP), such a Home SLP (H-SLP), Emergency SLP (E-SLP), or Discovered SLP (D-SLP). Location server 170 may be used (i) to obtain a location for UE 202 (e.g., from signal measurements obtained and transferred by UE 202) and/or (ii) to provide assistance data to UE 202 to enable UE 202 to acquire and measure signals (e.g., signals from one or more of base stations 11 and 21) and, in some cases, compute a location from these signal measurements. Examples of assistance data can be orbital and timing data for Global Positioning System (GPS) or other Global Navigation Satellite System (GNSS) satellites when GPS or GNSS positioning is used, or information concerning downlink transmission from eNodeBs nearby to a UE 202 (e.g., any of base stations 11 and 21) when OTDOA is used for positioning.

To enable positioning in LTE and 5G and to facilitate positioning measurements by a UE (e.g., UE 202), base stations periodically transmit PRS. More specifically, PRS are transmitted in pre-defined positioning subframes grouped by several consecutive subframes, known as one positioning occasion. Positioning occasions occur periodically with a certain periodicity of N subframes, i.e., the time interval between two positioning occasions. In LTE, the standardized periods N are 160, 320, 640, and 1280 ms, and the number of consecutive subframes are 1, 2, 4, and 6.

To allow for detecting PRS from multiple sites and at a reasonable quality, positioning subframes have been designed as low-interference subframes (LIS). In general, data transmission is suppressed in positioning subframes. This means that the PDSCH is not transmitted to the UE 202 during the PRS subframes. Thus, in synchronous networks, PRS are ideally interfered with only by PRS from other cells having the same PRS pattern index and not by the data transmissions. However, in non-synchronous networks, such as those with small cell base stations operating on the same or similar frequencies widely deployed, interference can be a significant problem.

Since for OTDOA positioning PRS from multiple distinct locations need to be measured, the UE 202 receiver may, in some situations, have to deal with PRS that are much weaker than those received from the serving cell. Furthermore, without the approximate knowledge of when the measured signals are expected to arrive in time, or the exact PRS pattern, the UE 202 would need to perform a signal search within a large window, which would impact the time and accuracy of the measurements as well as the complexity of the UE 202. To facilitate UE 202 measurements, the network (e.g., location server 170, core network 240) transmits assistance data to the UE 202 that includes, among other things, reference cell information, a neighbor cell list containing physical cell identities (PCIs) of neighbor cells, the number of consecutive downlink subframes, PRS transmission bandwidth, frequency, and the like.

The UE 202 can perform inter-frequency measurements of PRS from cells operating on different frequencies in measurement gaps. In LTE, measurement gaps are configured (and re-configured as necessary) by the network (e.g., location server 170, core network 240) to enable measurements on other LTE frequencies and/or other RATs (e.g., UTRAN, GSM, CDMA2000, etc.). The gap configuration is signaled to the UE 202 over the Resource Radio Control (RRC) protocol as part of the measurement configuration. Only one gap pattern can be configured at a time, and the network must re-configure the UE 202 to change the gap pattern. The same pattern is used for all types of configured measurements, e.g., inter-frequency neighbor cell measurements, inter-frequency positioning measurements, inter-RAT neighbor cell measurements, and inter-RAT positioning measurements.

In a multi-carrier wireless communication network (e.g., a multi-carrier LTE network), also known as carrier aggregation (CA), the measurement gaps may still be used for performing measurements on other RATs (e.g., GSM, UTRAN) or on non-configured LTE carrier frequencies (i.e., carriers not configured by RRC). The mobility measurements in LTE require the UE 202 to perform measurements over the synchronization signals, i.e., PSS and SSS, and CRS to enable inter-frequency handover and enhance system performance Examples of LTE mobility measurements are Reference Signal Received Power (RSRP) and Reference Signal Received Quality (RSRQ).

CA mode allows the UE 202 to simultaneously receive and/or transmit data over more than one carrier frequency. In order to operate on multiple carrier frequencies, a UE is equipped with multiple receivers and/or transmitters. The carrier frequency to which a receiver/transmitter of the UE is currently tuned is referred to as an "active carrier frequency" or simply an "active carrier." For example, a UE may have two receivers, Receiver 1 and Receiver 2, where Receiver 1 is a multi-band receiver that can be tuned to band (i.e., carrier frequency) X or band Y, and Receiver 2 is a one-band receiver tunable to band Z only. In this example, if the UE is being served in band X, band X would be referred to as the "primary serving cell" or "active carrier frequency," and Receiver 1 would need a measurement gap to tune from band X to band Y (referred to as a "secondary serving cell") in order to measure band Y (and vice versa). In contrast, whether the UE is being served in band X or band Y, the UE can measure band Z without interrupting the service on band X or band Y, such that no measurement gap is used.

In an intra-RAT multi-carrier system (also known as single RAT multi-carrier system), all the component carriers belong to the same RAT, e.g., LTE Frequency Division Duplex (FDD) multi-carrier system, LTE Time Division Duplex (TDD) multi-carrier system, UTRAN FDD multi-carrier system, or UTRAN TDD multi-carrier system. In LTE multi-carrier systems, it is possible to aggregate a different number of component carriers, of different bandwidths and possibly in different frequency bands, in the uplink and the downlink.

In a multi-carrier system, one of the carrier frequencies (also referred to as simply "carriers" or "bands") is referred to as the "primary carrier" or "anchor carrier" or "primary serving cell," and the remaining carrier frequencies are referred to as "component carriers" or "secondary carriers" or "secondary serving cells." In carrier aggregation, the anchor carrier is the carrier operating on the primary frequency utilized by a UE and the cell in which the UE either performs the initial RRC connection establishment procedure or initiates the RRC connection re-establishment procedure. The primary carrier carries all common and UE-specific control channels. A secondary carrier is a carrier operating on a secondary frequency that may be configured once the RRC connection is established between the UE and the anchor carrier and that may be used to provide additional radio resources. The secondary carrier may contain only necessary signaling information and signals, e.g., those that are UE-specific may not be present in the secondary carrier, since both primary uplink and downlink carriers are typically UE-specific. This means that different UEs 202 in a cell may have different downlink primary carriers. The same is true for the uplink primary carriers. For example, in a multi-carrier system consisting of two DL carriers (F1_DL, F2_DL) and two UL carriers (F1_UL, F2_UL), some of the UEs 202 may be assigned F1_DL as the primary carrier, and remaining ones may have F2_DL as their primary carrier. The network is able to change the primary carrier of any UE 202 at any time. This is done, for example, to balance the load on different carriers.

For example, referring back to FIG. 1, one of the frequencies utilized by the macro cell base station 11 may be an anchor carrier (or "primary serving cell," "primary cell") and other frequencies utilized by the macro cell base station 11 and/or the small cell base station 21 may be secondary carriers ("secondary serving cells," "secondary cells"), depending on the perspective of the UE (e.g., UE1, UE2). For example, one of the frequencies utilized by the macro cell base station 11 may be assigned to the UE2 as the anchor carrier and other frequencies utilized by the macro cell base station 11 and/or the small cell base station 21 may be assigned as secondary carriers. Additionally, one of the frequencies utilized by the small cell base station 21 may be assigned to the UE1 as the anchor carrier and other frequencies utilized by the small cell base station 21 may be assigned as secondary carriers.

The simultaneous transmission and/or reception of multiple carriers enables the UE 202 to significantly increase its data transmission and/or reception rates. For example, 2×20 MHz aggregated carriers in an LTE multi-carrier system would theoretically lead to a two-fold increase in data rate, compared to that attained by a single 20 MHz carrier.

In an inter-RAT multi-carrier system (also known as multi-RAT multi-carrier system), the component carriers may belong to different RATs in both uplink and downlink. For example, in such systems one component carriers may belong to LTE FDD and another one to LTE TDD. As another example, component carriers may belong to UTRAN FDD and E-UTRAN FDD. In such systems, one of the RATs may be considered as the main or primary RAT while the remaining ones are the auxiliary RATs. The anchor or primary carrier may typically belong to the primary RAT.

Note, as is known in the art, a base station may have one or more (e.g., three) arrays of antennas, each corresponding to a geographic cellular coverage area, referred to as a "sector," or "cell." Thus, the term "cell," "secondary cell," "secondary cell eNodeB," "SCell eNodeB," etc., refers to a cell, or sector, of a base station. For simplicity, the present disclosure refers to a base station and the corresponding cell interchangeably.

Figure 3:
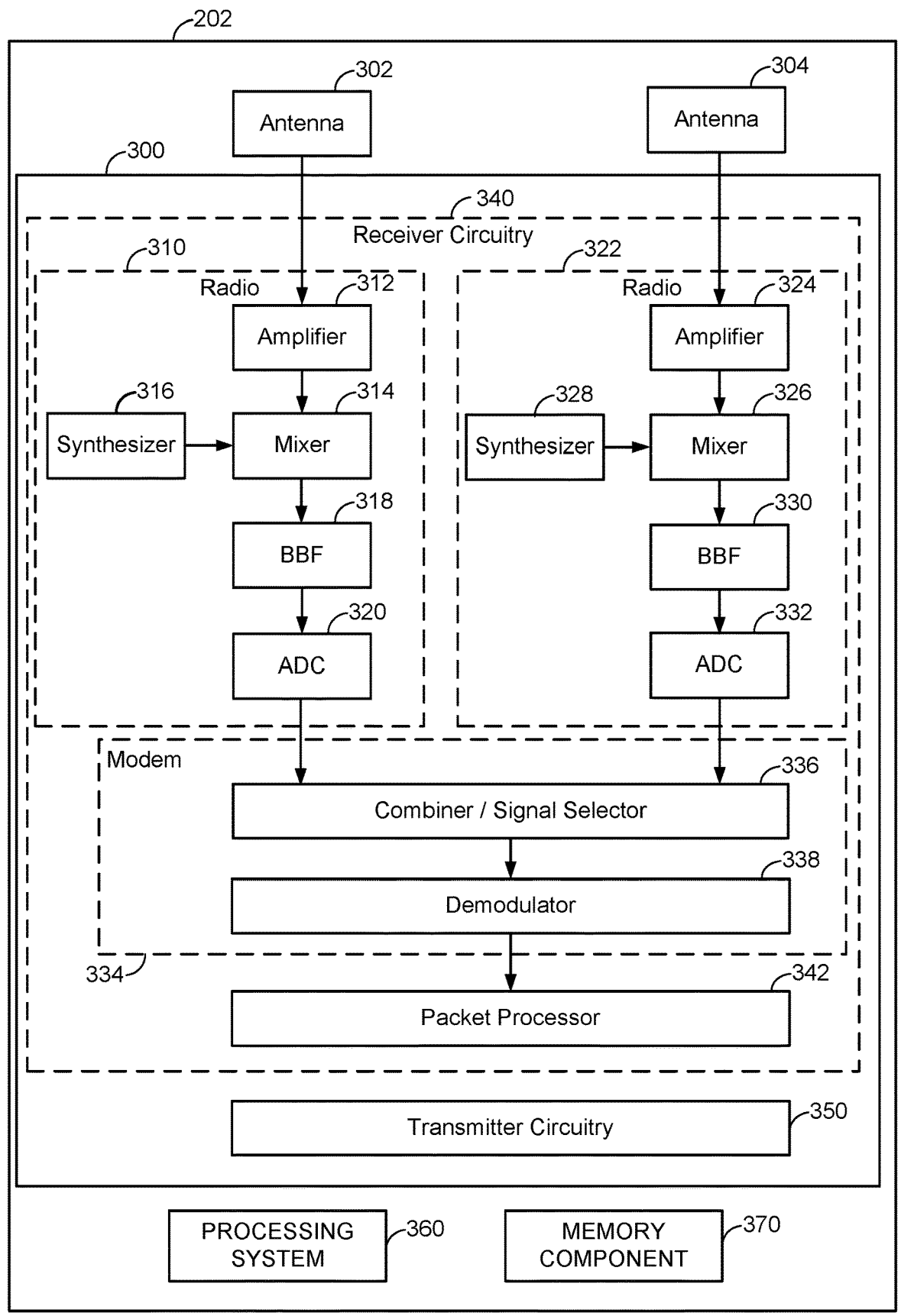
FIG. 3 is a block diagram illustrating a UE according to at least one aspect of the disclosure.

FIG. 3 illustrates an exemplary architecture of the UE 202 having a transceiver 300 capable of implementing carrier aggregation according to at least one aspect of the disclosure. The transceiver 300 may be coupled to first and second antennas 302 and 304.

The transceiver 300 includes receiver circuitry 340 and transmitter circuitry 350. The receiver circuitry 340 is capable of implementing carrier aggregation. As such, in the example of FIG. 3, the receiver circuitry 340 includes two radios 310 and 322 coupled to the two antennas 302 and 304, respectively. Note that although FIG. 3 illustrates only two antennas 302 and 304 and two radios 310 and 322, as will be appreciated, there may be more than two antennas and two radios. The transmitter circuitry 350 may also be capable of implementing carrier aggregation similarly to the receiver circuitry 340, but this is not shown in FIG. 3 for the sake of simplicity.

A transceiver (e.g., transceiver 300) generally includes a modem (e.g., modem 334) and a radio (e.g., radio 310 or 322). The radio, broadly speaking, handles selection and conversion of the radio frequency (RF) signals into the baseband or intermediate frequency and converts the RF signals to the digital domain. The modem is the remainder of the transceiver.

Referring to FIG. 3, radio 310 includes an amplifier 312, a mixer 314 (also referred to as a signal multiplier) for signal down conversion, a frequency synthesizer 316 (also referred to as an oscillator) that provides signals to the mixer 314, a baseband filter (BBF) 318, and an analog-to-digital converter (ADC) 320. Similarly, radio 322 includes an amplifier 324, a mixer 326, a frequency synthesizer 328, a BBF 330, and an ADC 332. The ADCs 320 and 332 are coupled to the signal combiner/signal selector 336 of the modem 334, which is coupled to the demodulator 338 of the modem 334. The demodulator 338 is coupled to a packet processor 342. The demodulator 338 and the packet processor 342 provide demodulated and processed single or multiple output signals to the communication controller and/or processing system 360.

Note that not every component illustrated in FIG. 3 is required for the operation of the system. For example, in direct RF to baseband conversion receivers, or any other direct conversion receivers, including certain Software Defined Radio (SDR) implementations, various components of the receiver circuitry 340 are not necessary, as is known in the art. In addition, while FIG. 3 illustrates a single modem 334 coupled to two radios 310 and 322, as will be appreciated, each radio 310 and 322 may be coupled to a different modem, and the receiver circuitry 340 would therefore include the same number of radios and modems.

As noted above, carrier aggregation is a technique whereby a UE (e.g., UE 202) can receive and/or transmit on multiple carrier frequencies at the same time, thereby increasing downlink and uplink data rates. Thus, the UE 202 may simultaneously utilize radio 310 to tune to one carrier frequency (e.g., the anchor carrier) and radio 322 to tune to a different carrier frequency (e.g., a secondary carrier). In addition, each radio 310 and 322 may be tunable to a plurality of different frequencies, one at a time.

UE 202 further includes a processing system 360 that may direct operations of its respective systems. Additionally, a memory component 370 can provide storage for program codes and data used by the processing system 360 and/or the transceiver 300. For example, the memory component 370 may include instructions that, when executed by the processing system 360 and/or transceiver 300, cause the UE 202 to perform the operations described herein. In an aspect, the processing system 360 may be an ASIC, or other processor, microprocessor, logic circuit, or other data processing device. In an aspect, the memory component 370 may be random access memory (RAM), flash memory, read-only memory (ROM), erasable programmable ROM (EPROM), electrically erasable programmable ROM (EEPROM), registers, hard disk, a removable disk, or any other form of storage medium known in the art.

Thus, in an aspect, where the UE 202 is configured to perform the operations described herein for performing inter-frequency reference signal measurements, the transceiver 300 and/or processing system 360 may tune a receiver (e.g., radio 310/322) away from a low overlap carrier frequency to a first reference signal carrier frequency on which a first reference signal is transmitted. In an aspect, the low overlap carrier frequency has a pattern of one or more subframes during which the low overlap carrier frequency does not carry data transmissions (e.g., ABS), and the pattern overlaps with a first reference signal measurement occasion of the first reference signal transmitted on the first reference signal carrier frequency more than other patterns of subframes that do not carry data transmissions of other carrier frequencies to which the plurality of receivers (e.g., radios 310 and 322) of the UE 202 are tuned overlap with the first reference signal measurement occasion. The receiver (e.g., radio 310/322) may measure the first reference signal during the first reference signal measurement occasion on the first reference signal carrier frequency during the pattern of one or more subframes during which the low overlap carrier frequency does not carry data transmissions. The transceiver 300 and/or processing system 360 may tune the receiver (e.g., radio 310/322) from the first reference signal carrier frequency back to the low overlap carrier frequency at an end of the first reference signal measurement occasion.

Figure 4:
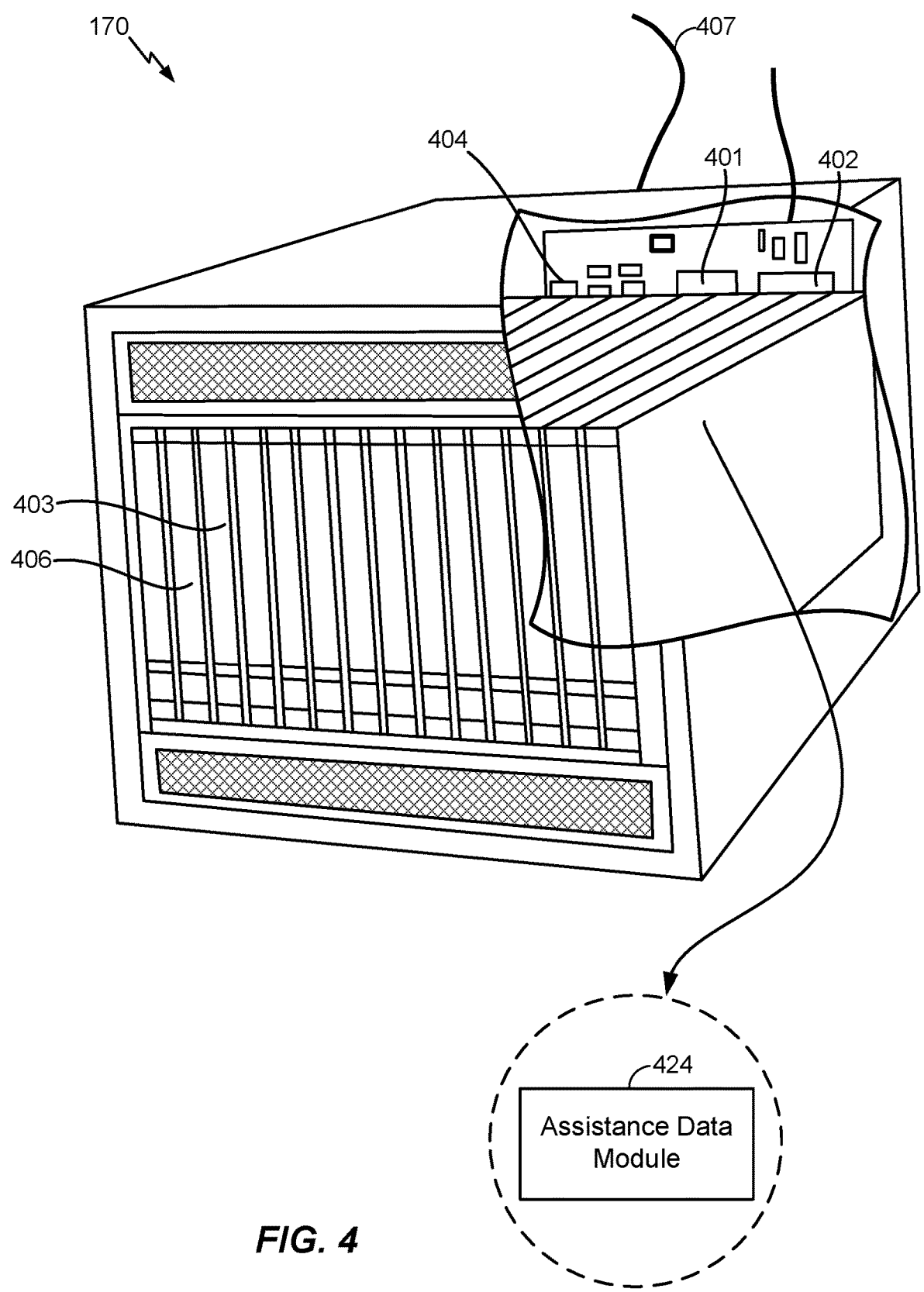
FIG. 4 illustrates an exemplary location server according to various aspects of the disclosure.

Various aspects of the disclosure may be implemented on any of a variety of commercially available server devices, such as location server 170 illustrated in FIG. 4. In FIG. 4, the location server 170 includes a processing system 401 coupled to volatile memory 402 and a large capacity non-volatile memory 403, such as a disk drive. The location server 170 may also include a floppy disc drive, compact disc (CD), or digital video disc (DVD) drive 406 coupled to the processing system 401. The location server 170 may also include a communication device 404, such as one or more network access ports, coupled to the processing system 401 for establishing data connections with a network 407, such as a local area network coupled to other broadcast system computers and servers or to the Internet 175.

In an aspect, the volatile memory 402 or the nonvolatile memory 403 may include an assistance data module 424 that may perform, or cause the performance of, the location server operations for assisting a UE to perform inter-frequency measurements in a CA mode as described herein. In an aspect, the assistance data module 424 may be a software module storing instructions that, when executed by the processing system 401, cause the location server 170 to perform the location server operations described herein. In another aspect, the assistance data module 424 may be a circuit that is part of or coupled to the processing system 401 that performs the location server operations described herein. In yet another aspect, the assistance data module 424 may be a combination of hardware and software, such as a firmware component of the location server 170.

Thus, in an aspect, where the location server 170 is configured to perform the operations described herein for assisting performance of inter-frequency measurements by a UE (e.g., UE 202) in a CA mode, the processing system 401, optionally as directed by the assistance data module 424, may identify a first receiver (e.g., radio 310/322) of a plurality of receivers of the UE that supports a first reference signal carrier frequency of a first inter-frequency neighbor cell, the plurality of receivers tuned to a corresponding plurality of active carrier frequencies, determine a first pattern of one or more subframes during which a first active carrier frequency of the plurality of active carrier frequencies of the UE does not carry data transmissions, and include information about the first inter-frequency neighbor cell in assistance data for the UE based on a reference signal measurement occasion of the first reference signal carrier frequency overlapping a subframe of the first pattern of one or more subframes by more than a threshold.

A multi-carrier UE, such as UE 202, may be configured with one or more receivers (e.g., receiver circuitry 340) tunable to one or more carrier frequencies. For example, the UE 202 may support downlink CA of up to five active carriers (where the UE 202 includes five radios simultaneously tuned to five different carrier frequencies) and uplink carriers of up to three active carriers (where the transmitter circuitry 350 includes three transmitters simultaneously tuned to three different carrier frequencies). Depending on the particular configuration of the receivers, the UE may tune away from the frequency band of its current serving cell to measure another frequency band from the serving cell or from a neighboring cell. Such measurements may be useful, for example, to assess the quality of a carrier channel before establishing a connection on the carrier. The measurements may include reference signal received power (RSRP) measurement and carrier received signal strength indication (RSSI), for example, and may be used as part of a radio resource management scheme to facilitate and optimize intra-cell band-switching and inter-cell handoff decisions. The time period during which the UE is tuned away from its serving cell is referred to as a "measurement gap."

For a given UE receiver architecture and a given serving band, the UE may or may not need measurement gaps for a targeted measurement band. The need for a measurement gap may depend, for example, on whether the two bands (serving and measurement) are supported by the same receiver in the UE or by different receivers in the UE, under the constraint that each receiver in the UE can only be tuned to one band at a time.

PRS measurements for OTDOA involve the UE (e.g., UE 202) measuring multiple neighbor cells (provided by the location server 170), as discussed above, which can be mix of inter-frequency and intra-frequency neighbor cells. For intra-frequency neighbor cells, the UE can measure the PRS of the neighbor cells without having to request and open measurement gaps. In contrast, for inter-frequency PRS measurements in CA mode, the UE needs to request a measurement gap from the serving cell for each inter-frequency neighbor cell (component carrier) and tune away from the serving cell to measure the PRS signal(s) from that inter-frequency neighbor. It then tunes back to the serving cell (anchor carrier) after performing the PRS measurement. However, tune away causes throughput degradation because reception of the current data stream is paused while the UE is tuned away from the serving cell to measure PRS. Another important consideration is that the network may not always grant a measurement gap when the UE requests it.

The current technical specifications do not specify which carrier frequency should be chosen for tune away to perform PRS measurements; rather, the decision is left to the UE. With the deployment of dense macro cell base stations and small cell base stations, interference has become a common problem and networks have been using ABS for its mitigation. The techniques described herein exploit the use of ABS for interference mitigation to reduce the number of measurement gaps used to perform inter-frequency PRS measurements for a UE operating in CA mode.

As a first solution, a UE can perform gapless inter-frequency PRS measurements. Specifically, for a UE operating in CA mode, all the active carriers can either belong to the same interfering cell set or a mix of cells from the same cell set and a few others as well. A UE can use each neighbor cell's ABS information (received from the cell or the location server 170) to determine the subframes during which certain cells will not be scheduling any data (e.g., on the PDSCH or Physical Downlink Control Channel (PDCCH)). Using this information, for a given PRS occasion of a neighbor cell, the UE identifies the active carrier that has an ABS subframe overlapping the PRS occasion and performs a tune away operation with that carrier to enable the carrier to measure that PRS occasion. Because the UE performs tune away during an ABS of the active carrier, it does not need to request a measurement gap for that carrier to perform the measurement. In this way, the PRS measurement can be done in a gapless fashion (either without requesting a measurement gap or in the case where a measurement gap request is denied) and with no loss of throughput.

Figure 5:
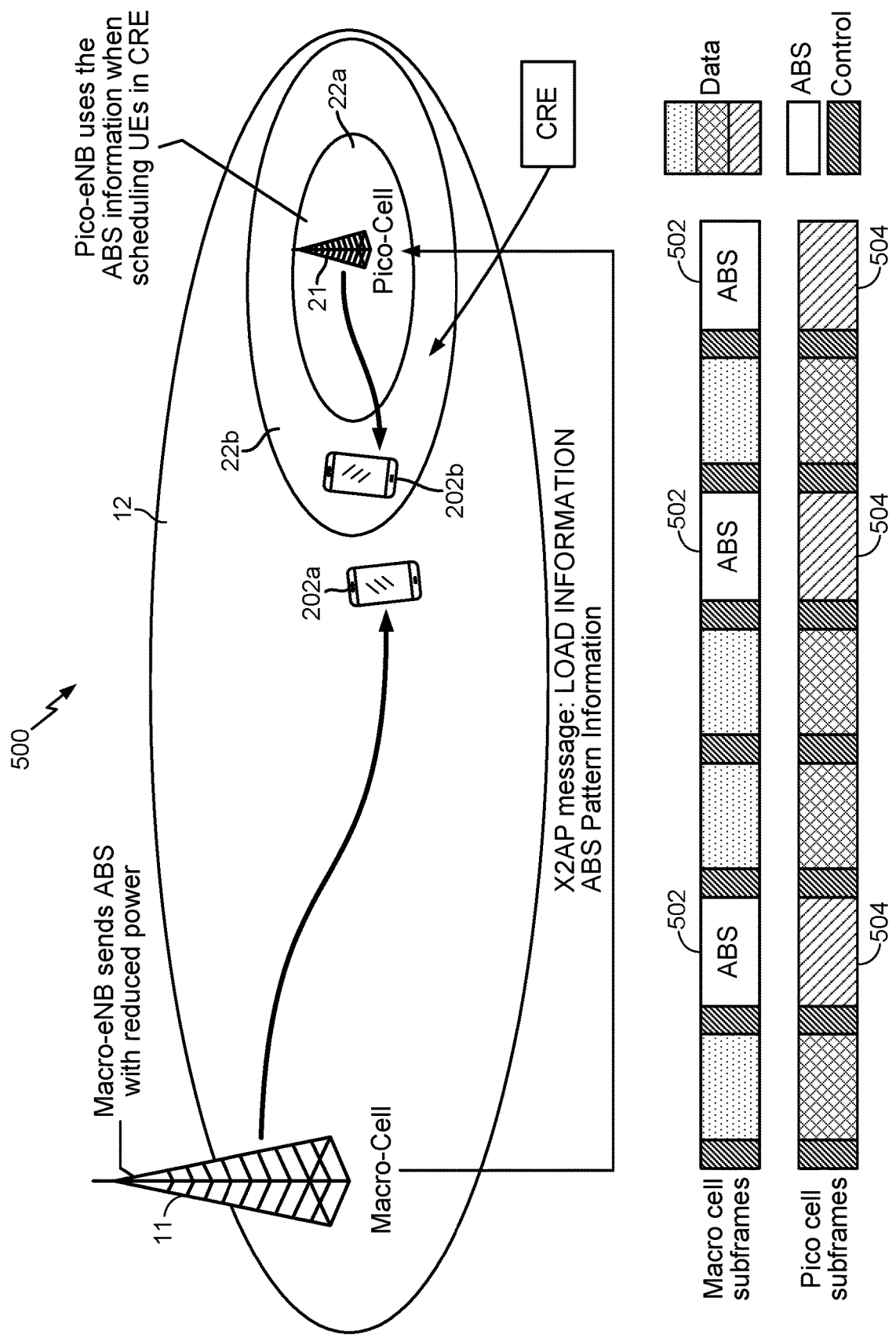
FIG. 5 illustrates an exemplary system in which a UE performs gapless inter-frequency PRS measurements according to at least one aspect of the disclosure.

This is illustrated in greater detail in FIG. 5. FIG. 5 illustrates an exemplary system 500 in which a UE performs gapless inter-frequency PRS measurements according to at least one aspect of the disclosure. As shown in FIG. 5, a UE 202*a* is served by the macro cell base station 11 and a UE 202*b* is located in the extended cell coverage area 22*b*, and may be served at times by either the macro cell base station 11 or the small cell base station 21. As an example, the macro cell base station 11 transmits a sequence of control subframes, data subframes, and ABS subframes 502 to UE 202*b*. The sequence of ABS subframes 502 is referred to as an "ABS pattern." The small cell base station 21 transmits PRS during PRS occasions 504. Other base stations, not shown in FIG. 5, may transmit PRS during different occasions.

Because the ABS subframes 502 of the macro cell base station 11 overlap with the PRS occasions 504 of the small cell base station 21, the UE 202*b* tunes its active carrier receiver (e.g., radio 310) away from the frequency of the macro cell base station 11 to the frequency of the small cell base station 21 during the ABS subframes 502 in order to measure the PRS occasions 504 of the small cell base station 21. After measuring the PRS occasion 504, the UE 202*b* tunes its active carrier back to the frequency of the macro cell base station 11 and resumes listening to the control and data subframes. In this way, the UE 202*b* can measure the PRS occasions 504 of the small cell base station 21 without requesting a measurement gap from the macro cell base station 11. Alternatively, the UE 202*b* can still measure the PRS occasions 504 of the small cell base station 21 if the macro cell base station 11 denies its request for a measurement gap.

Note that although FIG. 5 illustrates a complete overlap between the ABS subframes 502 and the PRS occasions 504, this may not always be the case. In that situation, the UE will select the active carrier for tune away that has the greatest overlap between an ABS subframe and a PRS occasion of a neighbor cell.

Figure 6:
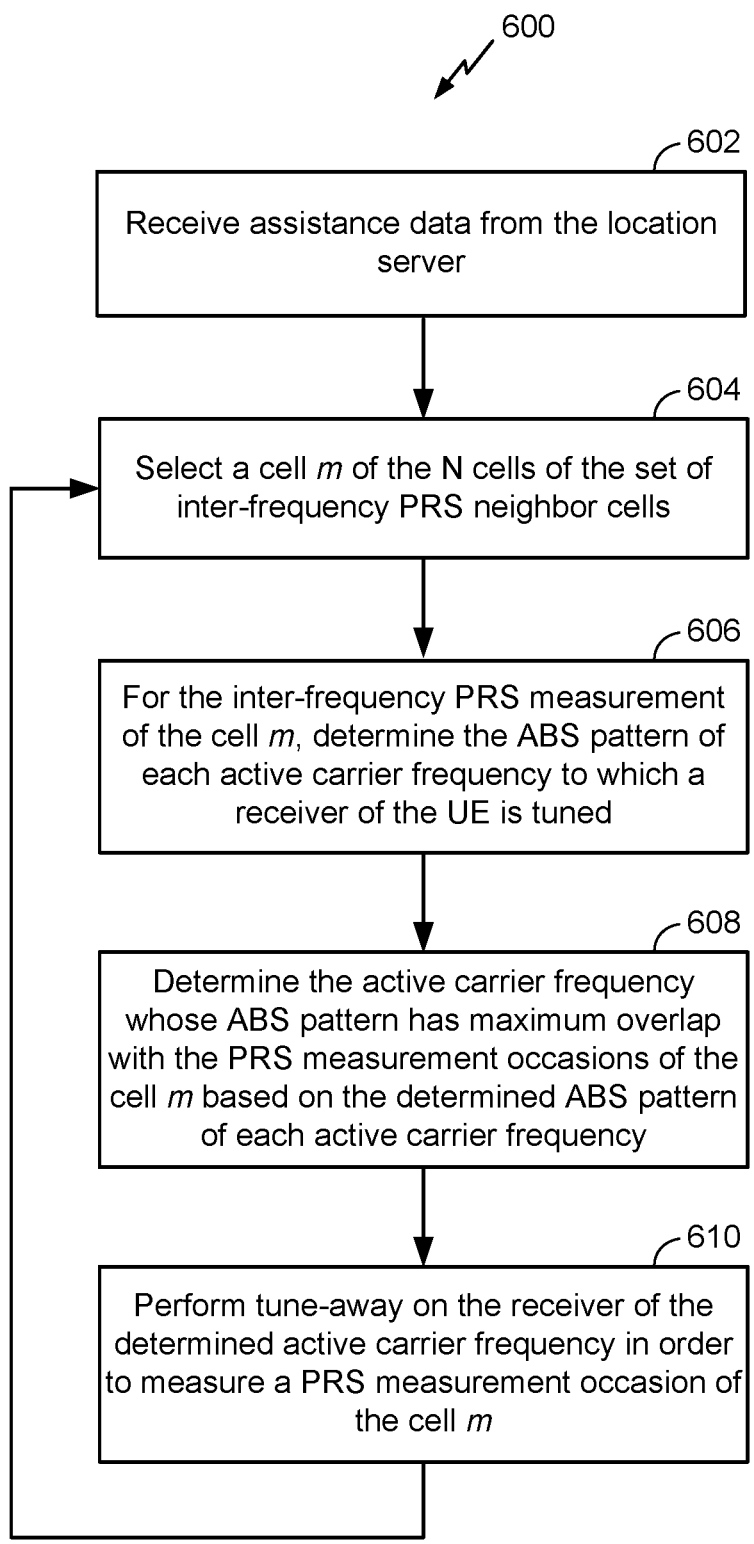
FIG. 6 illustrates an exemplary method for performing gapless inter-frequency PRS measurements according to the first solution disclosed herein.

FIG. 6 illustrates an exemplary method 600 for performing gapless inter-frequency PRS measurements according to the first solution disclosed herein. The method 600 may be performed by a UE, such as UE 202. In the example of FIG. 6, a plurality of N cells (e.g., $cell_1$, $cell_2$, ..., $cell_N$) make up the N cells of the set of inter-frequency PRS neighbor cells. The N cells may include one or more cells of one or more macro cell base station (e.g., macro cell base station 11) and/or one or more cells of one or more small cell base stations (e.g., small cell base station 21).

At 602, the UE receives assistance data from the location server (e.g., location server 170). The assistance data may include information about the set of N inter-frequency PRS neighbor cells thereby identifying a plurality of inter-frequency neighbor cells. At 604, the UE selects a cell m of the N cells of the set of inter-frequency PRS neighbor cells identified in the assistance data. At 606, in order to perform an inter-frequency PRS measurement of the cell m, the UE determines the ABS pattern (e.g., the sequence of ABS subframes 502 in FIG. 5) of each of the active carrier frequencies to which its receivers are currently tuned. The UE may receive this information from the respective cells/base stations. At 608, the UE determines the active carrier frequency whose ABS pattern has the maximum overlap with the PRS measurement occasions of the cell m based on the determined ABS pattern of each active carrier frequency. More specifically, the UE determines which active carrier frequency has the highest number of ABS subframes that overlap the highest number of PRS measurement occasions of the cell m. Such an active carrier frequency is referred to herein as a "low overlap carrier frequency," in one example. At 610, the UE performs tune away on the receiver of the active carrier frequency identified at 608 in order to measure a PRS measurement occasion of cell m. As discussed above, the UE tunes away from the active carrier frequency identified at 608 during an ABS of that active carrier frequency that overlaps a PRS occasion of the cell m. If, however, there is no overlap between a PRS measurement occasion of the cell m, or a sufficient number of PRS measurement occasions to perform a positioning operation, the UE can request a measurement gap on the active carrier frequency identified at 608 or another active carrier frequency in order to measure a PRS measurement occasion of the cell m, as is typically done.

The method 600 repeats for all N inter-frequency PRS neighbor cells. Thus, as illustrated in FIG. 6, the method returns to 604, and the UE selects a different cell m of the N cells of the set of inter-frequency PRS neighbor cells in the assistance data.

As a second solution, the UE may reorder PRS measurements. More specifically, a UE supports some specific CA combinations based on device capability, as not all receivers (e.g., radios 310 and 322) support all bands/frequencies. The only requirement in the standard is to report the PRS measurements in the same order in which the neighbor cell information was specified in the assistance data from the network (e.g., location server 170), even if the measurements are performed in a different order. Accordingly, the UE can determine an intelligent order for the PRS measurements of neighbor cells in order to achieve as many as possible of the measurements as gapless (i.e., without using measurements gaps to perform). The UE can check the ABS configuration of different cells, such as neighbor cells specified in the assistance data from the network (e.g., location server 170), and measure them in the determined order in order to achieve as many as possible of the measurements during the ABS of the respective carrier.

Figure 7:
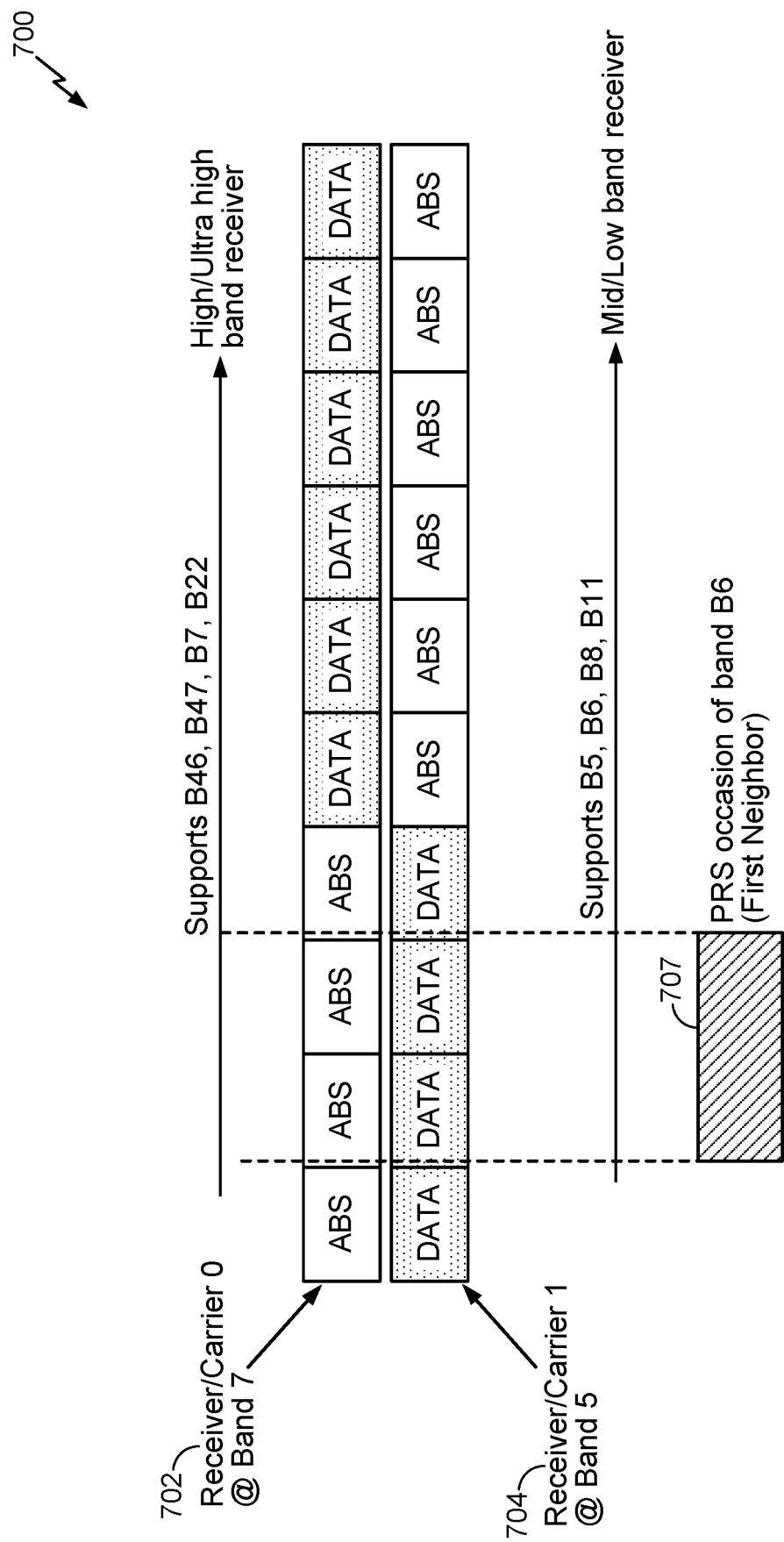
FIG. 7 illustrates an exemplary system in which a UE reorders PRS measurements according to at least one aspect of the disclosure.

This is illustrated in greater detail in FIG. 7. FIG. 7 illustrates an exemplary system 700 in which a UE reorders PRS measurements according to at least one aspect of the disclosure. As illustrated in FIG. 7, two receivers of a UE (e.g., UE 202) may be tuned to two active carriers 702 and 704. In the example of FIG. 7, a first receiver of the UE (e.g., radio 310) may support bands, or carrier frequencies, B46, B47, B7, and B22, and may currently be tuned to band B7. As such, first active carrier 702 corresponds to band B7. A second receiver of the UE (e.g., radio 322) may support bands, or carrier frequencies, B5, B6, B8, and B11, and may currently be tuned to band B5. As such, active carrier 704 corresponds to band B5. Thus, in the example of FIG. 7, the UE is currently in bands B7 and B5 carrier aggregation. Again, as shown in FIG. 7, note that not all receivers/carriers support all frequencies.

A neighbor cell (e.g., a secondary cell of macro cell base station 11 or small cell base station 21) may be operating on band B6, and therefore transmit PRS occasions 706 on band B6. The UE 202 may be aware that this neighbor cell transmits PRS occasions 706 on band B6 based on assistance data received from the network (e.g., location server 170) or from the base station itself. In order to measure a PRS occasion 706 from the neighbor cell, the UE determines when its band B6 receiver (e.g., radio 322) will be tuned to a frequency (e.g., B5) that has ABS subframes during a PRS occasion 706. In the example of FIG. 7, the first PRS occasion 706 occurs during data subframes of the second active carrier 704, not ABS subframes. As such, the UE will wait for a PRS occasion 706 that overlaps with ABS subframes of the second active carrier 704 (not shown in FIG. 7).

When ABS subframes for the second active carrier 704 occur during a PRS occasion 706, the UE will tune the receiver (e.g., radio 322) currently tuned to the second active carrier 704 away from band B5 to band B6 and measure the PRS occasion 706 on band B6. It will then tune the receiver back to band B5 and resume listening on band B5. Although the UE may measure the PRS occasion 706 out of the order specified in the assistance data, due to waiting for a PRS occasion 706 to overlap with ABS subframes of the second active carrier 704, the UE will still report the PRS measurement made during PRS occasion 706 to the network (e.g., location server 170) in the order specified in the assistance data. In the meantime, the UE may perform other PRS measurements on other frequencies as they coincide with ABS subframes for the active carriers capable of tuning to those frequencies.

Figure 8:
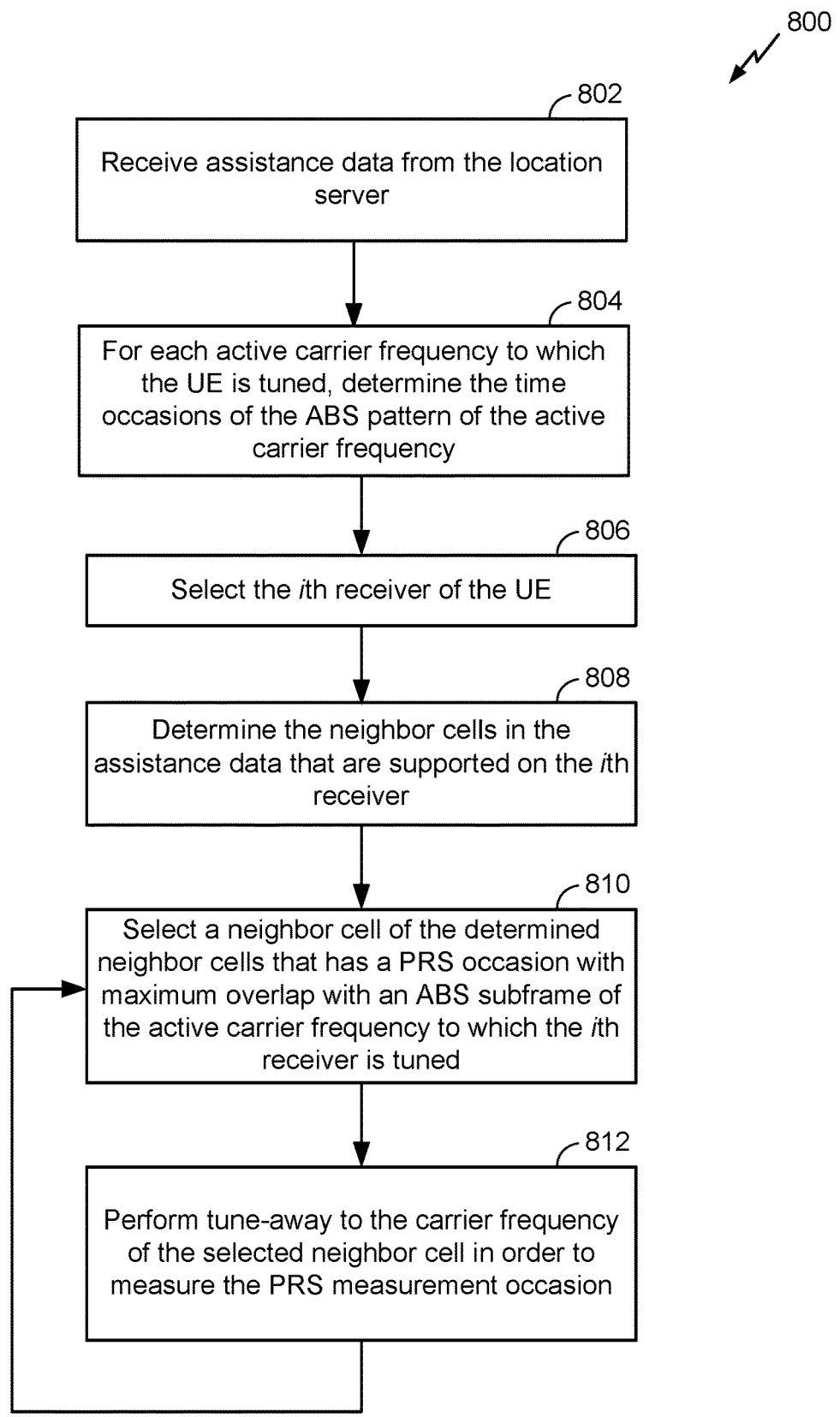
FIG. 8 illustrates an exemplary method for reordering PRS measurements according to the second solution disclosed herein.

FIG. 8 illustrates an exemplary method 800 for reordering PRS measurements according to the second solution disclosed herein. The method 800 may be performed by a UE, such as UE 202. In the example of FIG. 8, like the example of FIG. 6, a plurality of N cells (e.g., $cell_1$, $cell_2$, ..., $cell_N$) make up the N cells of the set of inter-frequency PRS neighbor cells. The N cells may include one or more cells of one or more macro cell base station (e.g., macro cell base station 11) and/or one or more cells of one or more small cell base stations (e.g., small cell base station 21).

At 802, the UE receives assistance data from the location server (e.g., location server 170). The assistance data may include information about the set of N inter-frequency PRS neighbor cells. At 804, the UE determines the time occasions (e.g., subframes) of the ABS pattern (e.g., the sequence of ABS subframes 502 in FIG. 5) of each of the different active carrier frequencies to which the UE's receivers are tuned. The UE may receive the ABS patterns from the respective cells/base stations. At 806, the UE selects its ith receiver. At 808, the UE determines a subset of the neighbor cells in the assistance data that are using a carrier frequency supported on the ith receiver. That is, the UE determines which carrier frequencies the neighbor cells are using and to which of those carrier frequencies the ith receiver can tune. In that way, the UE can identify which subset of neighbor cells are operating on a carrier frequency to which the ith receiver can tune. At 810, the UE selects the neighbor cell of the neighbor cells identified at 808 that has a PRS occasion with the maximum amount of overlap with an ABS subframe of the ABS pattern of the active carrier frequency to which the ith receiver is tuned. At 812, the UE can then tune away from the active carrier frequency during the ABS subframe. After 812, the UE then measures the PRS occasion of the neighbor cell selected at 810, and, after measuring the PRS occasion, tunes back to the active carrier frequency.

The method 800 repeats for all ABS occasions of the ABS pattern of the ith receiver. Thus, as illustrated in FIG. 8, the method 800 returns to 810, and the UE selects a different neighbor cell that has a PRS occasion that overlaps a different ABS subframe of the ABS pattern of the ith receiver. Hence, the UE repeats one or more of 804, 806, 808, 810, and 812, the measuring, and/or the tuning back for all subframes of the one or more subframes during which the low overlap carrier frequency does not carry data transmissions. Further, operations 806-812 are performed for all receivers i of the UE, in parallel. After performing operations 806-812 for each receiver i, the UE can report the measurements of the PRS occasions of the neighbor cells in the order those cells appear in the assistance data (not shown).

A third solution is a server (e.g., location server 170) assisted solution. On the UE side, at the time of capability sharing with the location server 170, the UE can also provide the ABS information for the interfering cells from the neighbor cell set. Currently, the UE only shares the bands/frequencies that it supports with the location server 170, in order for the location server 170 to provide assistance data including only neighbor cells operating with those bands/frequencies. Additional information elements (IEs) can be added to enable the UE to share this information.

On the server side, the location server 170 can use the ABS information from the UE to optimize the assistance data for the UE. For example, for PRS neighbor cells in the assistance data, the location server 170 can select their ordering and their measurement configurations ($I_{PRS}$, $PRS_{OFFSET}$, $N_{PRS}$) to ensure that most of the PRS occasions from the different neighbor cells align with the respective ABS of different cells. Additionally, the UE could request this selectively or explicitly using a new IE element. In this way, the order of the PRS occasions that the UE is to measure will match the order, to the extent possible, of the ABS of the carriers capable of tuning away to measure those PRS occasions. This is very similar to the UE's operations in the second solution described above, except that now the location server 170, rather than the UE, is reordering the neighbor list, and therefore the respective PRS measurements of those neighbors, to coincide with the ABS of the active carriers capable of tuning away to measure those PRS occasions.

Figure 9:
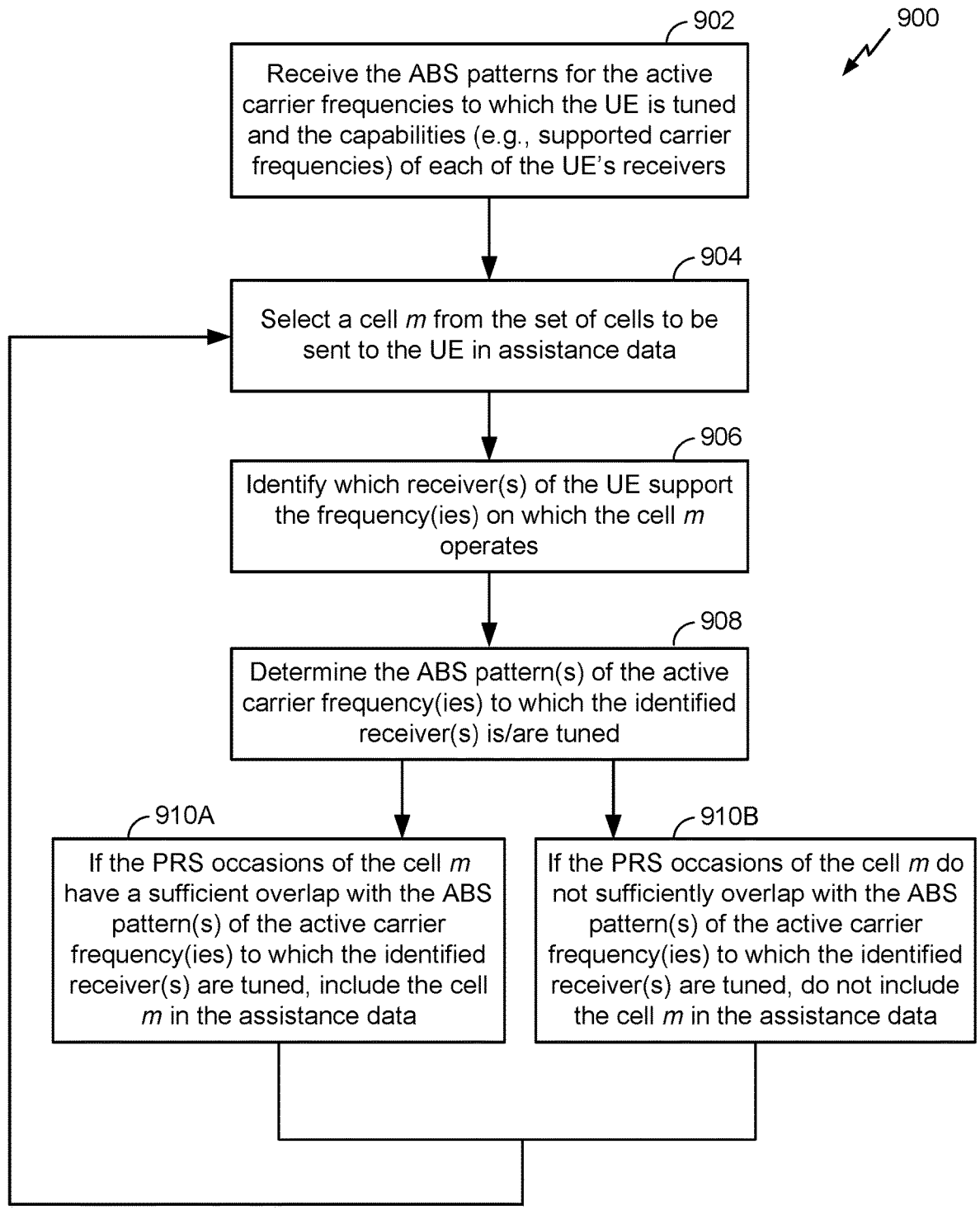
FIG. 9 illustrates an exemplary method for a server assisting PRS measurements according to the third solution disclosed herein.

FIG. 9 illustrates an exemplary method 900 for a server assisting PRS measurements according to the third solution disclosed herein. The method 900 may be performed by a location server, such as location server 170.

At 902, the location server receives the ABS patterns for the active carrier frequencies to which the receivers of the UE are tuned, along with the capabilities of each of the UE's receivers (e.g., the carrier frequencies to which each receiver can tune). In other words, the location server can receive from the UE, for each of the plurality of receivers of the UE, an identification of each carrier frequency supported by each of the plurality of receivers of the UE. Additionally, the location server can receive from the UE capability information of the UE indicating a number of the plurality of receivers of the UE. At 904, the location server selects a cell m from the set of cells to be sent to the UE in the assistance data. At 906, the location server identifies which receiver, or receivers, of the UE support the frequency, or frequencies, on which the cell m operates. More specifically, where the cell m operates on a single carrier frequency, the location server will identify which receiver of the UE supports (i.e., can listen to) that carrier frequency. However, where the cell m operates on multiple carrier frequencies, a single receiver of the UE may not be able to support all of those carrier frequencies. In that case, the location server will identify which receivers of the UE can listen to which carrier frequencies of the multiple carrier frequencies of the cell m. Note that the cell m may operate on one or more frequencies that none of the receivers of the UE can support.

At 908, the location server determines the ABS pattern(s) (e.g., the sequence of ABS subframes 502 in FIG. 5) of the active carrier frequency(ies) to which the receiver(s) identified at 906 is/are tuned. More specifically, if the location server identified a single receiver at 906, then at 908, it determines the ABS pattern for the active carrier frequency for that receiver. If the location server identified multiple receivers at 906, then at 908, the location server determines the ABS pattern for the active carrier frequency corresponding to each identified receiver. The location server may determine the ABS pattern from the information received from the UE at 902. From 908, there are two options. At 910A, if the PRS occasions of the cell m have a sufficient (e.g., above some threshold) overlap with the ABS pattern(s) of the active carrier frequency(ies) to which the receiver(s) identified at 906 is/are tuned, the location server includes the cell m in the assistance data for the UE. However, at 910B, if the PRS occasions of the cell m do not sufficiently (e.g., less than some threshold) overlap the ABS pattern(s) of the active carrier frequency(ies) to which the identified receiver(s) is/are tuned, the location server does not include the cell m in the assistance data for the UE. Either way, the method 900 repeats for all neighbor cells to be shared with the UE in the assistance data. Thus, as illustrated in FIG. 9, the method 900 returns to 904, and the location server selects a different cell m. Hence the location server repeats one or more of 904, 906, 908, 910A, and/or 910B for each of the plurality of inter-frequency neighbor cells. Once the method 900 completes, the location server can send the generated assistance data to the UE (not shown). In an aspect, the location server can order, in the assistance data, the inter-frequency neighbor cells based on the order in which the UE is able to measure PRS measurement occasions of those cells during ABS subframes of the active carrier frequencies to which its receivers are tuned. For example, the location server can order a first neighbor cell before remaining neighbor cells based on the UE being able to measure a PRS measurement occasion of the first neighbor cell during an ABS subframe of a first active carrier frequency before being able to measure a second PRS measurement occasion of a second neighbor cell during an ABS subframe of a second active carrier frequency.

Note that the first and second solutions described herein can be combined, or used independently of each other, whereas if the third solution is used, there would be no need to implement either of the first two solutions.

Note also that the solutions described herein are applicable to UEs in the CRE area (e.g., extended cell coverage area 22b), as these UEs will be listening to one base station (e.g., either macro cell base station 11 or small cell base station 21) and experiencing significant interference from another base station (e.g., the other of macro cell base station 11 and small cell base station 21).

Although FIGS. 6, 8, and 9 have been described in terms of PRS, as will be appreciated, the techniques described herein are applicable to other types of reference signals, such as CRS and the like.

Figure 10:
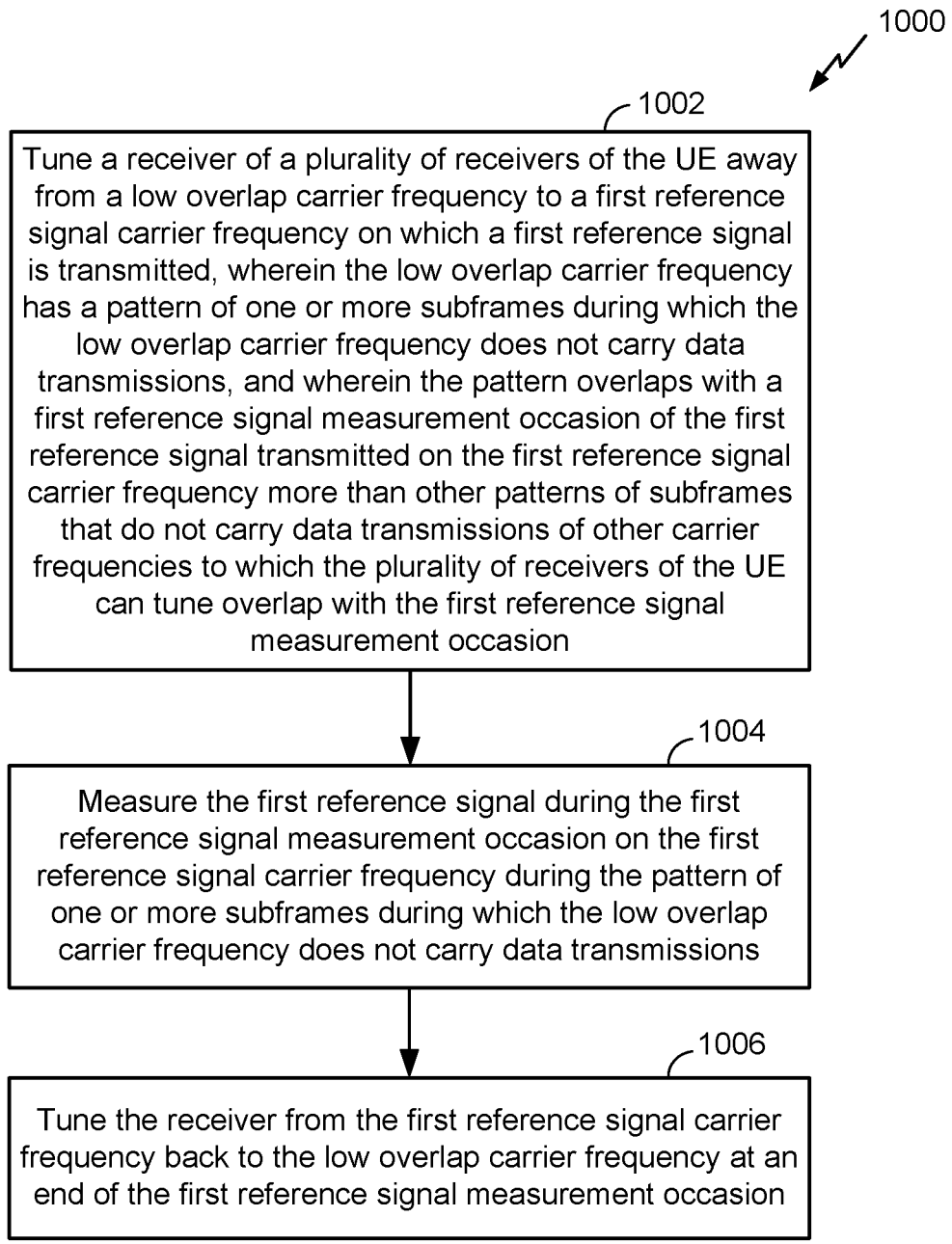
FIG. 10 illustrates an exemplary method for performing inter-frequency measurements by a UE in a CA mode according to at least one aspect of the disclosure.

FIG. 10 illustrates an exemplary method 1000 for performing inter-frequency measurements by a UE (e.g., UE 202) in a CA mode according to at least one aspect of the disclosure. At 1002, the UE (e.g., receiver circuitry 340 as directed by processing system 360) tunes a receiver (e.g., radio 310 or 322) of a plurality of receivers of the UE away from a low overlap carrier frequency to a first reference signal carrier frequency on which a first reference signal is transmitted, as at 610 of FIG. 6 or 812 of FIG. 8. In an aspect, the low overlap carrier frequency may have a pattern of one or more subframes during which the low overlap carrier frequency does not carry data transmissions, and the pattern overlaps with a first reference signal measurement occasion of the first reference signal transmitted on the first reference signal carrier frequency more than other patterns of subframes that do not carry data transmissions of other carrier frequencies to which the plurality of receivers of the UE are tuned overlap with the first reference signal measurement occasion.

At 1004, a receiver (e.g., radio 310 or 322) of the UE measures the first reference signal during the first reference signal measurement occasion on the first reference signal carrier frequency during the pattern of one or more subframes during which the low overlap carrier frequency does not carry data transmissions, as at 610 of FIG. 6 or 812 of FIG. 8. At 1006, the UE (e.g., receiver circuitry 340 as directed by processing system 360) tunes the receiver from the first reference signal carrier frequency back to the low overlap carrier frequency at an end of the first reference signal measurement occasion.

Figure 11:
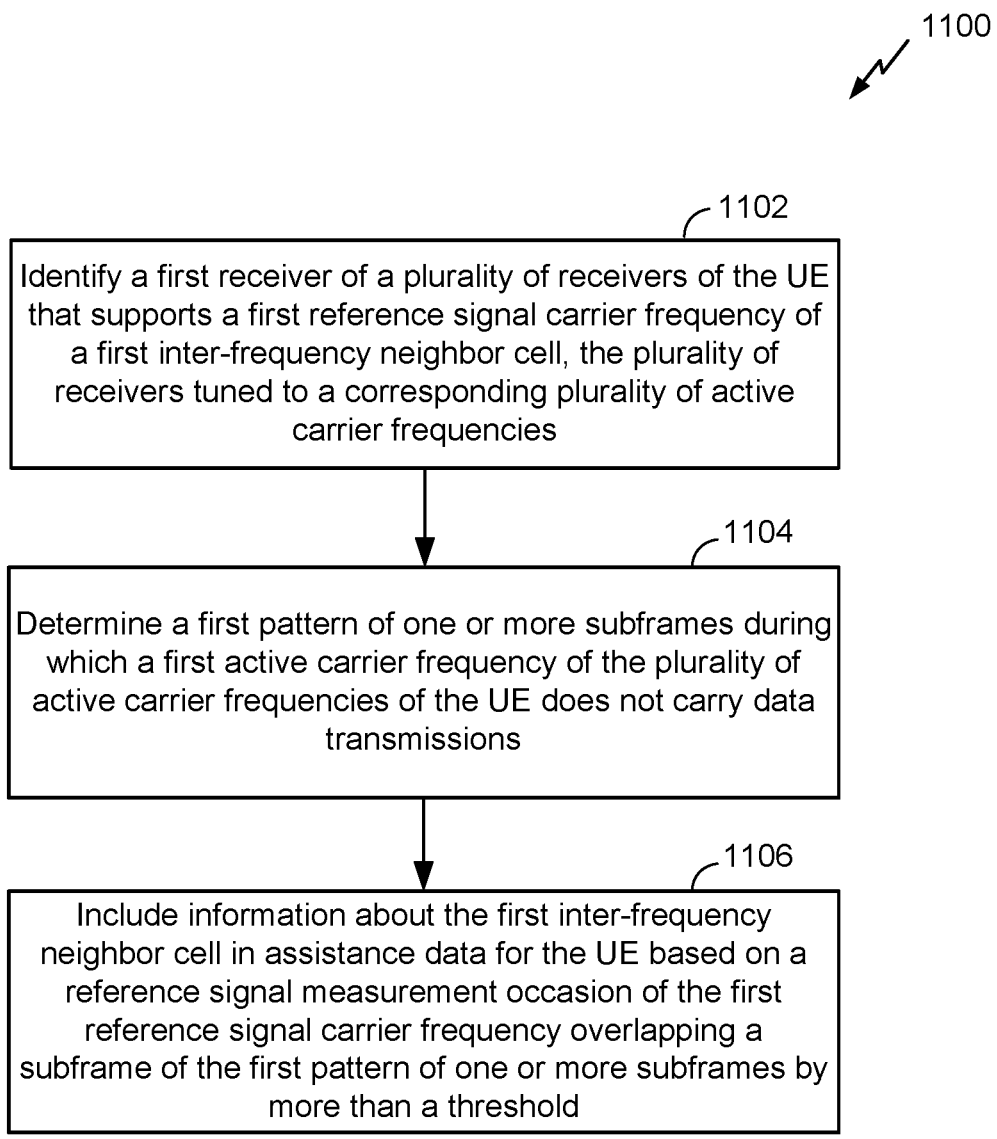
FIG. 11 illustrates an exemplary method for assisting performance of inter-frequency measurements by a UE in a CA mode according to at least one aspect of the disclosure.

FIG. 11 illustrates an exemplary method 1100 for assisting performance of inter-frequency measurements by a UE (e.g., UE 202) in a CA mode according to at least one aspect of the disclosure. The method 1100 may be performed by a location server, such as location server 170. At 1102, the location server (e.g., processing system 401) identifies a first receiver (e.g., radio 310 or 322) of a plurality of receivers of the UE that supports a first reference signal carrier frequency of a first inter-frequency neighbor cell, the plurality of receivers tuned to a corresponding plurality of active carrier frequencies. At 1104, the location server (e.g., processing system 401) determines a first pattern of one or more subframes during which a first active carrier frequency of the plurality of active carrier frequencies of the UE does not carry data transmissions. At 1106, the location server (e.g., processing system 401) includes information about the first inter-frequency neighbor cell in assistance data for the UE based on a reference signal measurement occasion of the first reference signal carrier frequency overlapping a subframe of the first pattern of one or more subframes by more than a threshold.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements. In addition, terminology of the form "at least one of A, B, or C" or "one or more of A, B, or C" or "at least one of the group consisting of A, B, and C" used in the description or the claims means "A or B or C or any combination of these elements." For example, this terminology may include A, or B, or C, or A and B, or A and C, or A and B and C, or 2A, or 2B, or 2C, and so on.

In view of the descriptions and explanations above, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Accordingly, it will be appreciated, for example, that an apparatus or any component of an apparatus may be configured to (or made operable to or adapted to) provide functionality as taught herein. This may be achieved, for example: by manufacturing (e.g., fabricating) the apparatus or component so that it will provide the functionality; by programming the apparatus or component so that it will provide the functionality; or through the use of some other suitable implementation technique. As one example, an integrated circuit may be fabricated to provide the requisite functionality. As another example, an integrated circuit may be fabricated to support the requisite functionality and then configured (e.g., via programming) to provide the requisite functionality. As yet another example, a processor circuit may execute code to provide the requisite functionality.

Moreover, the methods, sequences, and/or algorithms described in connection with the aspects disclosed herein may be embodied directly in hardware, in a software module executed by a processor, or in a combination of the two. A software module may reside in RAM, flash memory, ROM, EPROM, EEPROM, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor (e.g., cache memory).

Accordingly, it will also be appreciated, for example, that certain aspects of the disclosure can include a computer-readable medium embodying a method for determining a position of a UE communicating over a shared communication medium in unlicensed spectrum.

While the foregoing disclosure shows various illustrative aspects, it should be noted that various changes and modifications may be made to the illustrated examples without departing from the scope defined by the appended claims. The present disclosure is not intended to be limited to the specifically illustrated examples alone. For example, unless otherwise noted, the functions, steps, and/or actions of the method claims in accordance with the aspects of the disclosure described herein need not be performed in any particular order. Furthermore, although certain aspects may be described or claimed in the singular, the plural is contemplated unless limitation to the singular is explicitly stated.

What is claimed is:

1. A method for performing inter-frequency reference signal measurements by a user equipment (UE) in a carrier aggregation (CA) mode, comprising:

tuning, by the UE, a receiver of a plurality of receivers of the UE away from a low overlap carrier frequency to a first reference signal carrier frequency on which a first reference signal is transmitted, wherein the low overlap carrier frequency has a pattern of one or more subframes during which the low overlap carrier frequency does not carry data transmissions, and wherein the pattern overlaps with a first reference signal measurement occasion of the first reference signal transmitted on the first reference signal carrier frequency more than other patterns of subframes that do not carry data transmissions of other carrier frequencies to which the plurality of receivers of the UE are tuned overlap with the first reference signal measurement occasion;

measuring, by the receiver of the UE, the first reference signal during the first reference signal measurement occasion on the first reference signal carrier frequency during the pattern of one or more subframes during which the low overlap carrier frequency does not carry data transmissions; and tuning, by the UE, the receiver from the first reference signal carrier frequency back to the low overlap carrier frequency at an end of the first reference signal measurement occasion.

2. The method of claim 1, further comprising:

receiving, at the UE, assistance data identifying a plurality of inter-frequency neighbor cells, wherein a first inter-frequency neighbor cell of the plurality of inter-frequency neighbor cells operates on the first reference signal carrier frequency.

3. The method of claim 2, further comprising:

selecting, by the UE, based on reception of the assistance data, the first inter-frequency neighbor cell of the plurality of inter-frequency neighbor cells, the first inter-frequency neighbor cell operating on the first reference signal carrier frequency; and determining, by the UE, for each carrier frequency of a plurality of carrier frequencies to which the plurality of receivers of the UE are tuned, a pattern of one or more subframes during which the carrier frequency does not carry data transmissions, wherein the UE selects the low overlap carrier frequency from the plurality of carrier frequencies based on the pattern overlapping with the first reference signal measurement occasion more than other patterns of subframes that do not carry data transmissions of remaining carrier frequencies of the plurality of carrier frequencies overlap with the first reference signal measurement occasion.

4. The method of claim 3, wherein the UE repeats the selecting, the determining, the selecting, the tuning away, the measuring, and the tuning back for each of the plurality of inter-frequency neighbor cells.

5. The method of claim 3, further comprising:
requesting, by the UE, a measurement gap on the low overlap carrier frequency in order to measure a third reference signal measurement occasion on a third reference signal carrier frequency based on the pattern of one or more subframes not overlapping the third reference signal measurement occasion.

6. The method of claim 2, further comprising:
determining, by the UE, for each carrier frequency of a plurality of carrier frequencies to which the plurality of receivers of the UE are tuned, a pattern of one or more subframes during which the carrier frequency does not carry data transmissions;
determining, by the UE, a subset of inter-frequency neighbor cells of the plurality of inter-frequency neighbor cells supported by the receiver; and
selecting, by the UE, the first inter-frequency neighbor cell of the subset of inter-frequency neighbor cells from which to measure the first reference signal measurement occasion based on the first reference signal measurement occasion having a maximum amount of overlap with a first subframe of the pattern of one or more subframes during which the low overlap carrier frequency does not carry data transmissions, wherein the first inter-frequency neighbor cell operates on the first reference signal carrier frequency,
wherein the UE tunes the receiver of the plurality of receivers of the UE away from the low overlap carrier frequency to the first reference signal carrier frequency based on selecting the first inter-frequency neighbor cell.

7. The method of claim 6, wherein the UE repeats the determining the pattern, the determining the subset of inter-frequency neighbor cells, the selecting, the tuning away, the measuring, and the tuning back for all subframes of the one or more subframes during which the low overlap carrier frequency does not carry data transmissions.

8. The method of claim 6, wherein the UE tunes the receiver away from the low overlap carrier frequency during the first subframe of the pattern of one or more subframes.

9. The method of claim 6, wherein the UE performs the determining a pattern, the determining the subset of inter-frequency neighbor cells, the selecting, the tuning away, the measuring, and the tuning back for each of the plurality of receivers in parallel.

10. The method of claim 6, further comprising:
reporting, by the UE, a measurement of a reference signal from each of the plurality of inter-frequency neighbor cells to a location server.

11. The method of claim 10, wherein the UE measures the reference signal from each of the plurality of inter-frequency neighbor cells in a different order than an order of the plurality of inter-frequency neighbor cells specified in the assistance data.

12. The method of claim 11, wherein the UE reports the measurement of the reference signal from each of the plurality of inter-frequency neighbor cells to the location server in the order of the plurality of inter-frequency neighbor cells specified in the assistance data.

13. The method of claim 6, wherein the first reference signal carrier frequency is not one of the plurality of carrier frequencies.

14. The method of claim 6, wherein the first reference signal carrier frequency is one of the plurality of carrier frequencies.

15. The method of claim 1, wherein the UE does not request measurement gaps on the low overlap carrier frequency in order to measure the first reference signal on the first reference signal carrier frequency.

16. The method of claim 1, wherein the pattern of one or more subframes during which the low overlap carrier frequency does not carry data transmissions comprises a pattern of almost-blank subframes (ABS).

17. The method of claim 16, wherein the data transmissions comprise Physical Downlink Shared Channel (PDSCH) transmissions or Physical Downlink Control Channel (PDCCH) transmissions.

18. The method of claim 1, wherein the UE receives the pattern of one or more subframes during which the low overlap carrier frequency does not carry data transmissions from a cell operating on the first reference signal carrier frequency.

19. The method of claim 1, wherein the UE is located in a cell range extension (CRE) area of a serving cell.

20. The method of claim 19, wherein the serving cell comprises a cell of a small cell base station within a coverage area of a macro cell base station, and wherein the first reference signal measurement occasion is transmitted by the macro cell base station.

21. An apparatus for performing inter-frequency reference signal measurements by a user equipment (UE) in a carrier aggregation (CA) mode, comprising:
a transceiver of the UE configured to:
tune a receiver of a plurality of receivers of the UE away from a low overlap carrier frequency to a first reference signal carrier frequency on which a first reference signal is transmitted, wherein the low overlap carrier frequency has a pattern of one or more subframes during which the low overlap carrier frequency does not carry data transmissions, and wherein the pattern overlaps with a first reference signal measurement occasion of the first reference signal transmitted on the first reference signal carrier frequency more than other patterns of subframes that do not carry data transmissions of other carrier frequencies to which the plurality of receivers of the UE are tuned overlap with the first reference signal measurement occasion;
cause the receiver to measure the first reference signal during the first reference signal measurement occasion on the first reference signal carrier frequency during the pattern of one or more subframes during which the low overlap carrier frequency does not carry data transmissions; and
tune the receiver from the first reference signal carrier frequency back to the low overlap carrier frequency at an end of the first reference signal measurement occasion.

* * * * *